US009967893B2

(12) United States Patent
Freda et al.

(10) Patent No.: US 9,967,893 B2
(45) Date of Patent: May 8, 2018

(54) METHODS AND APPARATUSES FOR SPECTRUM SENSING IN AN OPPORTUNISTIC BAND

(75) Inventors: Martino Freda, Laval (CA); Athmane Touag, Chomedey Laval (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 279 days.

(21) Appl. No.: 13/976,430

(22) PCT Filed: Nov. 15, 2011

(86) PCT No.: PCT/US2011/060764
§ 371 (c)(1),
(2), (4) Date: Oct. 15, 2013

(87) PCT Pub. No.: WO2012/078320
PCT Pub. Date: Jun. 14, 2012

(65) Prior Publication Data
US 2014/0029585 A1    Jan. 30, 2014

Related U.S. Application Data

(60) Provisional application No. 61/413,726, filed on Nov. 15, 2010.

(51) Int. Cl.
*H04W 72/10* (2009.01)
*H04W 16/14* (2009.01)
(Continued)

(52) U.S. Cl.
CPC .......... *H04W 72/10* (2013.01); *H04W 16/14* (2013.01); *H04W 48/16* (2013.01); *H04W 88/02* (2013.01)

(58) Field of Classification Search
CPC . H04W 72/10; H04W 16/14; H04W 74/0808; H04W 74/0816; H04W 74/0825; H04W 74/08
See application file for complete search history.

(56) References Cited

U.S. PATENT DOCUMENTS

| 8,655,283 B2 | 2/2014 | Sun et al. |
| 2007/0060065 A1 | 3/2007 | Kruys et al. |

(Continued)

FOREIGN PATENT DOCUMENTS

| CN | 101754234 A | 6/2010 |
| CN | 101765124 A | 6/2010 |

(Continued)

OTHER PUBLICATIONS

3rd Generation Partnership Project(3GPP), TS 36.213, v. 9.3.0, "Technical Specification Group Radio Access Network Evolved Universal Terrestrial Radio Access (E-UTRA) Physical layer procedures (Release 9)", Sep. 2010, 1-80.

(Continued)

*Primary Examiner* — Michael Thier
*Assistant Examiner* — Zhensheng Zhang
(74) *Attorney, Agent, or Firm* — Condo Roccia Koptiw LLP

(57) ABSTRACT

A system, apparatuses and methods are provided for communicating in an opportunistic band. Channels that are reserved for primary users are used by sensing devices when primary users are not present. A geo-location database is configured to store occupancy information of a channel and information associated with the primary user of the channel. The database includes information such as the type of primary user, and the expected occupancy time of a channel by a primary user. Sensing devices are categorized into different classes based on their sensing capability. A device capabilities database stores device classification information associated with the sensing devices attached to a dynamic spectrum management system.

17 Claims, 14 Drawing Sheets

(51) Int. Cl.
*H04W 48/16* (2009.01)
*H04W 88/02* (2009.01)

(56) References Cited

U.S. PATENT DOCUMENTS

| | | | |
|---|---|---|---|
| 2008/0089389 A1* | 4/2008 | Hu | 375/132 |
| 2009/0197627 A1 | 8/2009 | Kuffner et al. | |
| 2009/0316638 A1* | 12/2009 | Yi et al. | 370/329 |
| 2010/0069013 A1 | 3/2010 | Chaudhri et al. | |
| 2010/0195566 A1* | 8/2010 | Krishnamurthy et al. | 370/328 |
| 2010/0240316 A1 | 9/2010 | Mahonen et al. | |
| 2010/0279725 A1 | 11/2010 | Muraoka et al. | |
| 2011/0170559 A1* | 7/2011 | Zhang | H04J 3/1694 370/442 |
| 2011/0317632 A1* | 12/2011 | Bahl | H04W 4/02 370/329 |
| 2012/0129467 A1* | 5/2012 | Wang et al. | 455/67.14 |
| 2012/0134328 A1 | 5/2012 | Gauvreau et al. | |
| 2014/0228067 A1 | 8/2014 | Kwak et al. | |

FOREIGN PATENT DOCUMENTS

| | | |
|---|---|---|
| JP | 2010-050935 A | 3/2010 |
| JP | 2010-525715 A | 7/2010 |
| JP | 2012-523207 A | 9/2012 |
| WO | WO 2009/044292 A2 | 4/2009 |
| WO | WO 2009/084463 A1 | 7/2009 |
| WO | WO 2010/117998 A2 | 10/2010 |
| WO | WO 2012064502 A1 | 5/2012 |

OTHER PUBLICATIONS

Federal Communications Commission(FCC), Second Memorandum Opinion and Order (FCC 10-174)—Sep. 23, 2010, pp. 1-101 http://hraunfoss.fcc.gov/edocs_public/attachmatch/FCC-10-174A1.pdf.
CN 101754234 A, Cited in Office Action dated Sep. 17, 2015, issued in related Chinese application No. 201180063809.3.
CN 101765124 A, Cited in Office Action dated Sep. 17, 2015, issued in related Chinese application No. 201180063809.3.
JP 2010-050935 A, Cited in Office Action dated Mar. 1, 2016, issued in related Japanese application No. 2015-000462.
Wang et al., "First Cognitive Radio Networking Standard for Personal/Portable Devices in TV White Spaces", IEEE, Apr. 6-9, 2010, 12 pages.
Baykas et al., "Overview of TV White Spaces: Current Regulations, Standards and Coexistence between Secondary Users", IEEE 21st International Symposium on Personal, Indoor and Mobile Radio Communications Workshops, Instanbul, 2010, pp. 38-43.
European Telecommunications Standards Institute (ETSI), TR 102 802 V1.1.1, "Reconfigurable Radio Systems (RRS), Cognitive Radio System Concept", Feb. 2010, 31 pages.

* cited by examiner

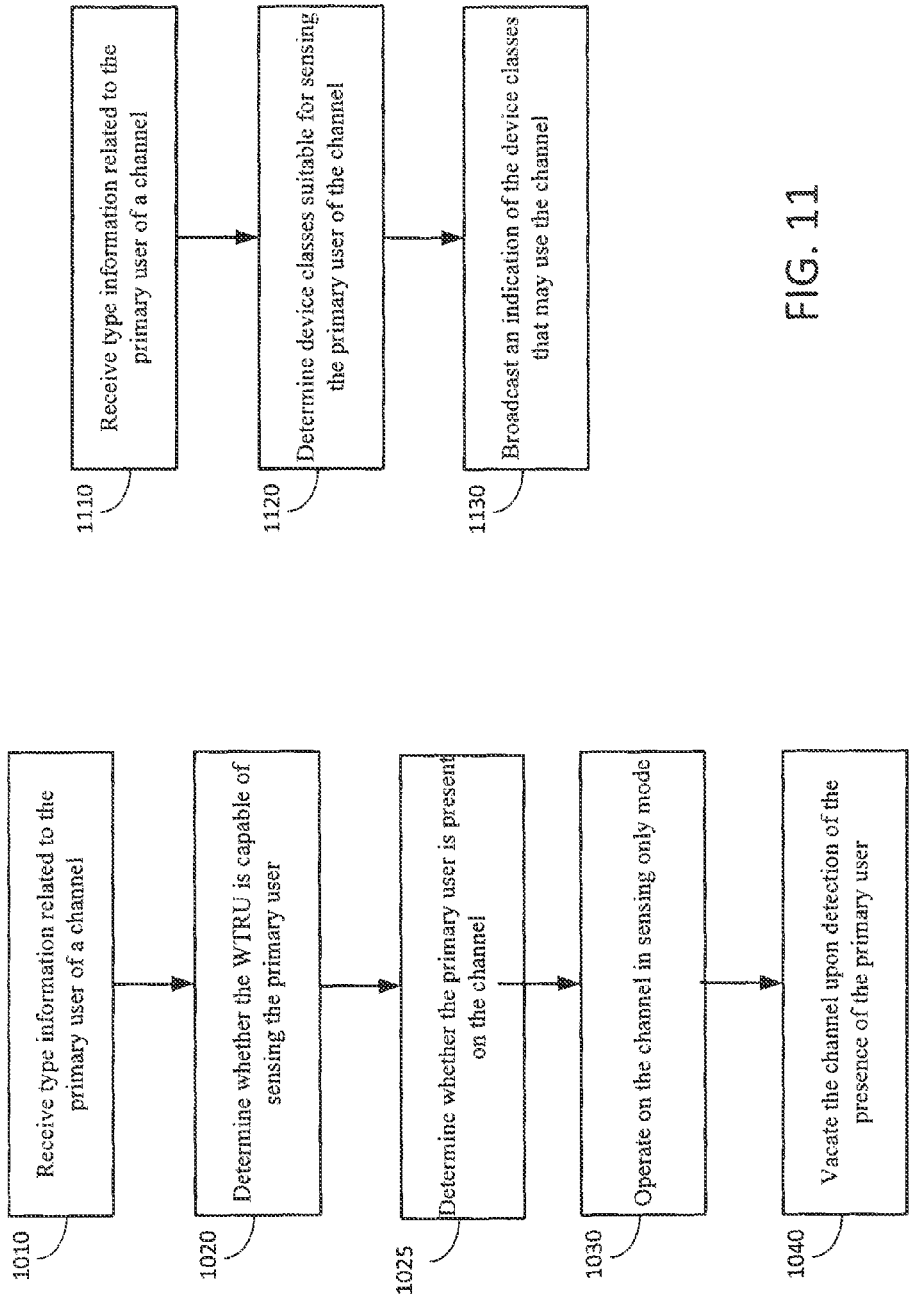

METHODS AND APPARATUSES FOR SPECTRUM SENSING IN AN OPPORTUNISTIC BAND

CROSS-REFERENCE TO RELATED APPLICATIONS

This application claims the benefit of U.S. Provisional Application No. 61/413,726, filed Nov. 15, 2010, which is hereby incorporated by reference herein.

BACKGROUND

Local Wireless Network systems such as 802.11 operate in predefined spectrum such as the industrial, scientific and medical (ISM) bands. The spectrum allowed by cellular licensed devices and devices operating in unlicensed devices does not change over time. 802.11 devices operate in a contiguous spectrum channel. 802.11 devices operate in a contiguous spectrum channel.

In the United States, 408 MHz of spectrum from 54 MHz to 806 MHz may be allocated for TV. Currently, 108 MHz of that spectrum is being redeveloped for commercial operations through auctions and for public safety applications. The remaining 300 MHz of this prime radio spectrum may remain dedicated for over-the-air TV operations. However, throughout the United States, portions of that 300 MHz resource remain unused. The amount and exact frequency of unused spectrum may vary from location to location. These unused portions of spectrum are examples of Television White Spaces (TVWS).

TVWS described above is an example of an opportunistic band. An opportunistic band may allow unlicensed use of a spectrum by one or more unregistered systems, or secondary devices, but may reserve priority to registered systems/ services, or primary users. However, current sensing technology cannot efficiently manage access to opportunistic spectrum by the registered or primary devices as well as unregistered or secondary devices. For example, it is desirable to simplify devices that are capable of operating as unregistered or secondary devices in an opportunistic band.

SUMMARY

It is desirable to implement a mechanism that may efficiently manage access to opportunistic bands by the registered devices or primary users as well as unregistered or secondary devices.

Systems and methods are provided for communicating in an opportunistic band. In an embodiment, a sensing device may use opportunistic bands even if the sensing device is only capable of sensing a subset of primary user types. For example, a sensing device capable of sensing one type of primary user may operate on opportunistic bands while satisfying Federal Communications Commission (FCC) regulations.

In an embodiment, channels that are reserved for primary users may be used by sensing devices when primary users are not present. A database, such as geo-location database, may be configured to store occupancy information of a channel as well as information associated with the primary user of the channel. The database may include information such as the type of primary user and the expected occupancy time of a channel by a primary user. Based on the channel occupancy information, a sensing device may monitor a reserved channel for one type of primary user, such as wireless microphone or digital television (DTV).

Sensing devices may be categorized into different classes based on their sensing capability. A device capabilities database may be configured to store device classification information associated with the sensing devices attached to a dynamic spectrum management system.

In an embodiment, a wireless transmit and receive unit (WTRU) may receive primary user information of a channel. The WTRU may determine whether the WTRU can sense the primary user of the channel. If the WTRU determines that the WTRU can sense the primary user, the WTRU may perform sensing on the channel. If the WTRU determines that the primary user is absent, the WTRU may operate on the channel, and may monitor the channel for the presence of the primary user. Upon detection of the primary user, the WTRU may vacate the channel.

BRIEF DESCRIPTION OF THE DRAWINGS

A more detailed understanding may be had from the following description, given by way of example in conjunction with the accompanying drawings.

FIGS. 10 and 11 illustrate example processes for communicating in an opportunistic band.

DETAILED DESCRIPTION OF ILLUSTRATIVE EMBODIMENTS

Figure 1A:
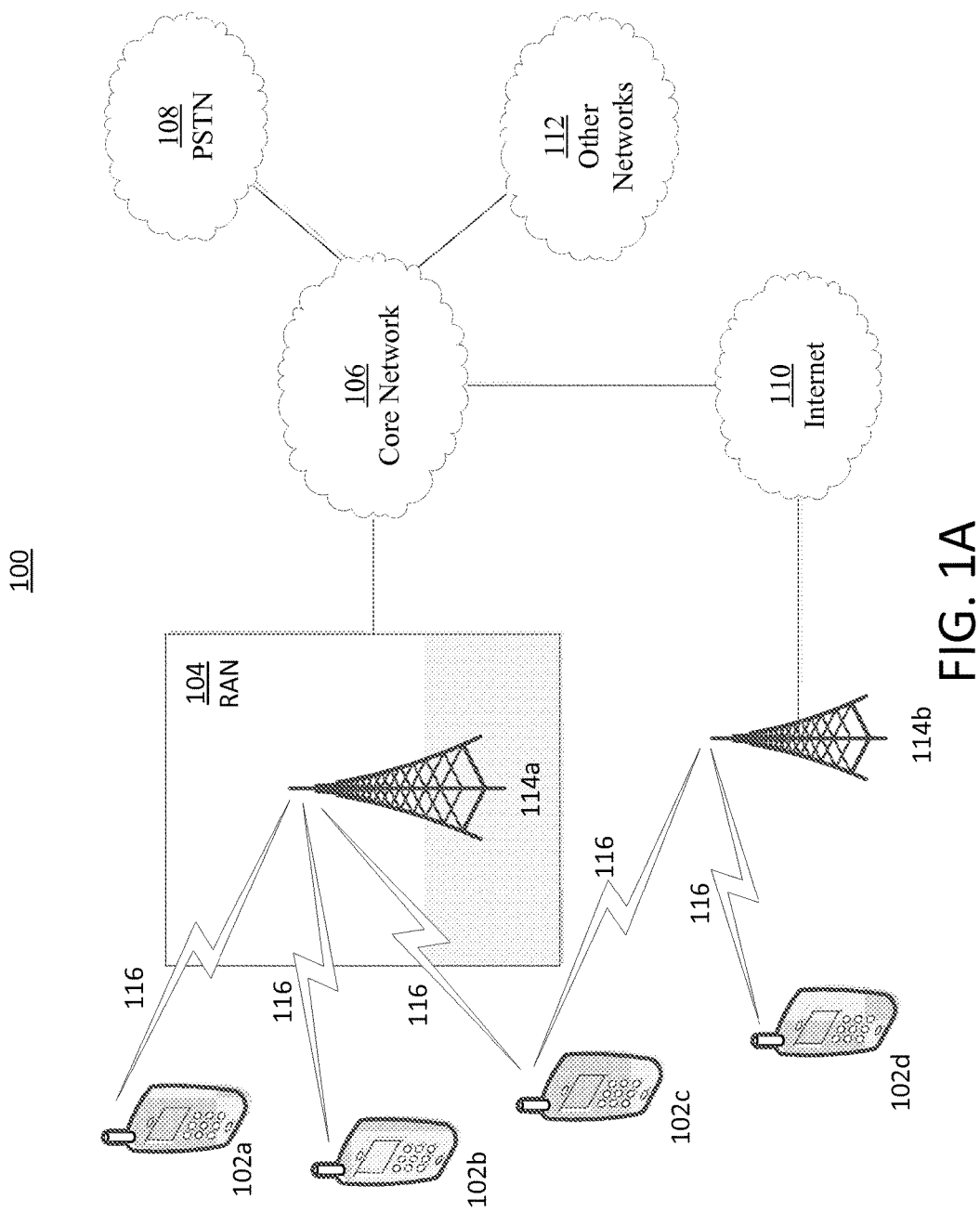
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The core network 106 may include at least one transceiver and at least one processor. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
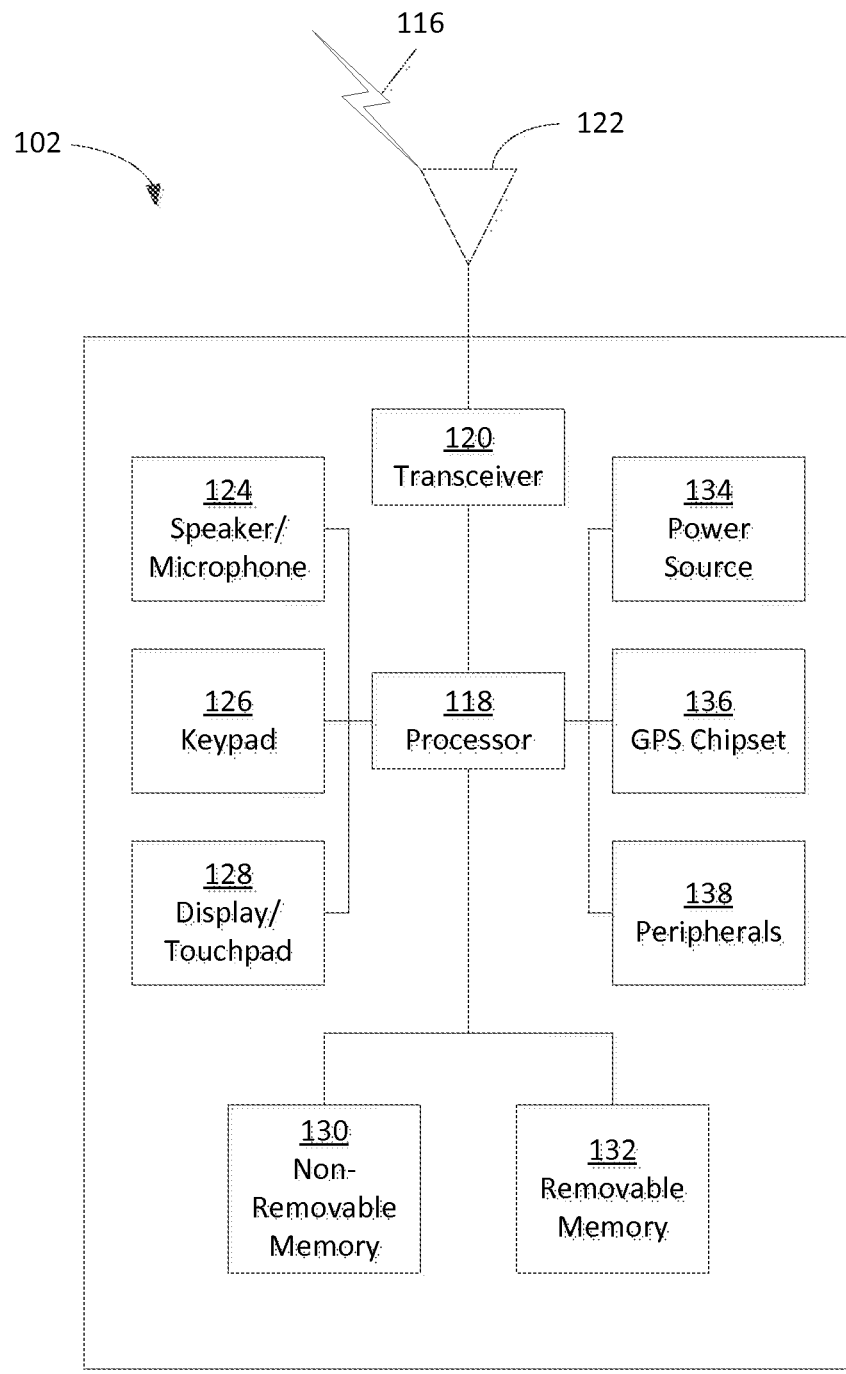
FIG. 1B is a system diagram of an example WTRU that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in an embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals. In addition, although the transmit/receive element 122 is depicted in FIG. 1B as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
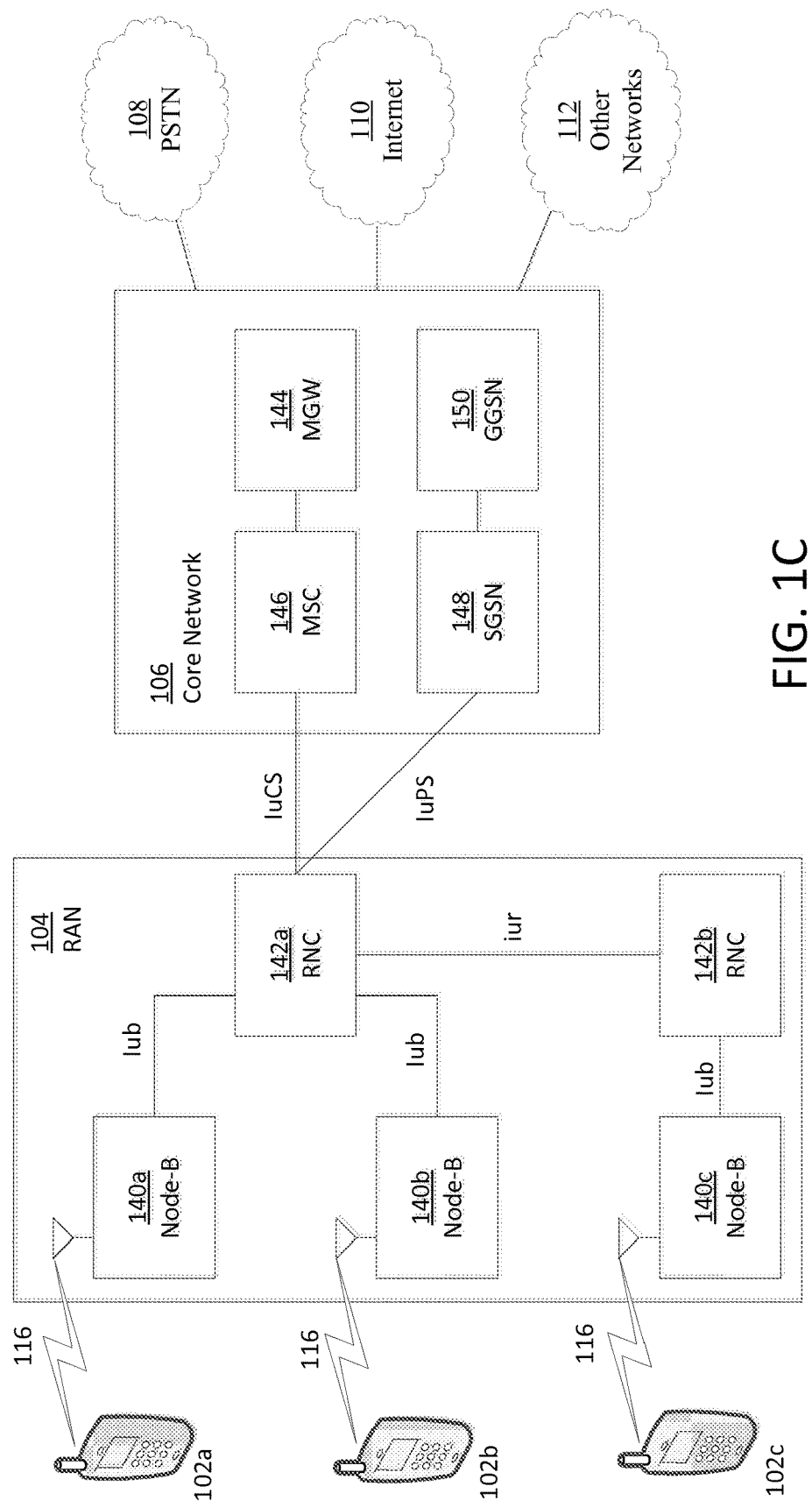
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ a UTRA radio technology to communicate with the WTRUs 102a, 102b and 102c over the air interface 116. The RAN 104 may also be in communication with the core network 106. As shown in FIG. 1C, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN 104 may also include RNCs 142a, 142b. It will be appreciated that the RAN 104 may include any number of Node-Bs and RNCs while remaining consistent with an embodiment.

As shown in FIG. 1C, the Node-Bs 140*a*, 140*b* may be in communication with the RNC 142*a*. Additionally, the Node-B 140*c* may be in communication with the RNC142*b*. The Node-Bs 140*a*, 140*b*, 140*c* may communicate with the respective RNCs 142*a*, 142*b* via an Iub interface. The RNCs 142*a*, 142*b* may be in communication with one another via an Iur interface. Each of the RNCs 142*a*, 142*b* may be configured to control the respective Node-Bs 140*a*, 140*b*, 140*c* to which it is connected. In addition, each of the RNCs 142*a*, 142*b* may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142*a* in the RAN 104 may be connected to the MSC 146 in the core network 106 via an IuCS interface. The MSC 146 may be connected to the MGW 144. The MSC 146 and the MGW 144 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices.

The RNC 142*a* in the RAN 104 may also be connected to the SGSN 148 in the core network 106 via an IuPS interface. The SGSN 148 may be connected to the GGSN 150. The SGSN 148 and the GGSN 150 may provide the WTRUs 102*a*, 102*b*, 102*c* with access to packet-switched networks, such as the Internet 110, to facilitate communications between and the WTRUs 102*a*, 102*b*, 102*c* and IP-enabled devices. As noted above, the core network 106 may also be connected to the networks 112, which may include other wired or wireless networks that are owned and/or operated by other service providers.

Figure 1D:
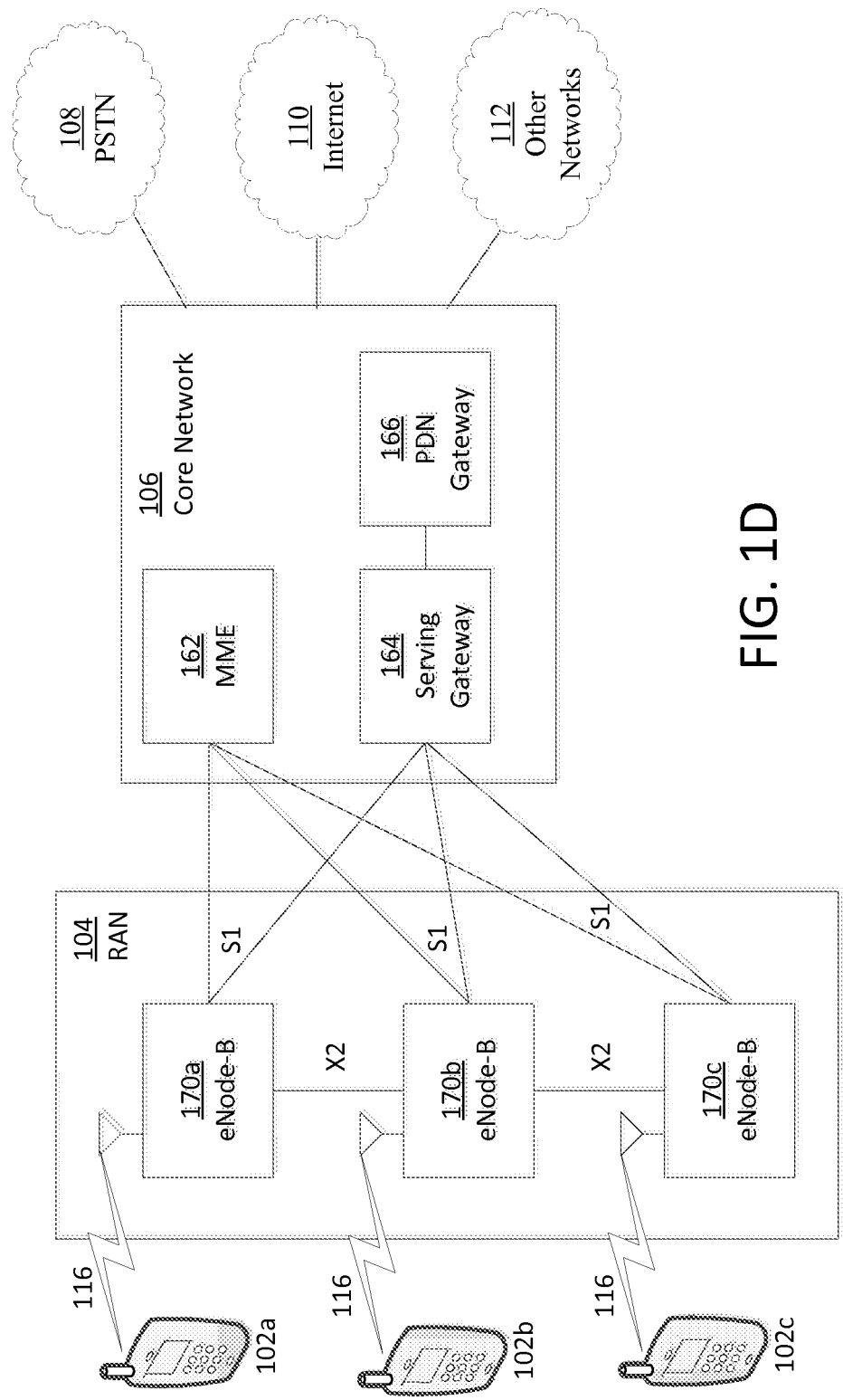
FIG. 1D is a system diagram of an example radio access network and an example core network that may be used within the communications system illustrated in FIG. 1A.

FIG. 1D is a system diagram of the RAN 104 and the core network 106 according to an embodiment. As noted above, the RAN 104 may employ an E-UTRA radio technology to communicate with the WTRUs 102*a*, 102*b* and 102*c* over the air interface 116. The RAN 104 may also be in communication with the core network 106.

The RAN 104 may include eNode-Bs 170*a*, 170*b* and 170*c*, though it will be appreciated that the RAN 104 may include any number of eNode-Bs while remaining consistent with an embodiment. The eNode-Bs 170*a*, 170*b*, 170*c* may each include one or more transceivers for communicating with the WTRUs 102*a*, 102*b*, 102*c* over the air interface 116. In an embodiment, the eNode-Bs 170*a*, 170*b*, 170*c* may implement MIMO technology. Thus, the eNode-B 140*a*, for example, may use multiple antennas to transmit wireless signals to, and receive wireless signals from, the WTRU 102*a*.

Each of the eNode-Bs 170*a*, 170*b* and 170*c* may be associated with a particular cell (not shown) and may be configured to handle radio resource management decisions, handover decisions, scheduling of users in the uplink and/or downlink, and the like. As shown in FIG. 1D, the eNode-Bs 170*a*, 170*b*, 170*c* may communicate with one another over an X2 interface.

The core network (CN) 106 shown in FIG. 1D may include a mobility management gateway (MME) 162, a serving gateway 164, and a packet data network (PDN) gateway 166. While each of the foregoing elements are depicted as part of the core network 106, it will be appreciated that any one of these elements may be owned and/or operated by an entity other than the core network operator.

The MME 162 may be connected to each of the eNode-Bs 170*a*, 170*b* and 170*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may also provide a control plane function for switching between the RAN 104 and other RANs (not shown) that employ other radio technologies, such as GSM or WCDMA.

The serving gateway 164 may be connected to each of the eNode Bs 170*a*, 170*b*, 170*c* in the RAN 104 via the S1 interface. The serving gateway 164 may generally route and forward user data packets to/from the WTRUs 102*a*, 102*b*, 102*c*. The serving gateway 164 may also perform other functions, such as anchoring user planes during inter-eNode B handovers, triggering paging when downlink data is available for the WTRUs 102*a*, 102*b*, 102*c*, managing and storing contexts of the WTRUs 102*a*, 102*b*, 102*c*, and the like.

The serving gateway 164 may also be connected to the PDN gateway 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The core network 106 may facilitate communications with other networks. For example, the core network 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102*a*, 102*b*, 102*c* with access to the networks 112, which may include other wired or wireless networks that are owned and/or operated by other service providers.

Figure 1E:
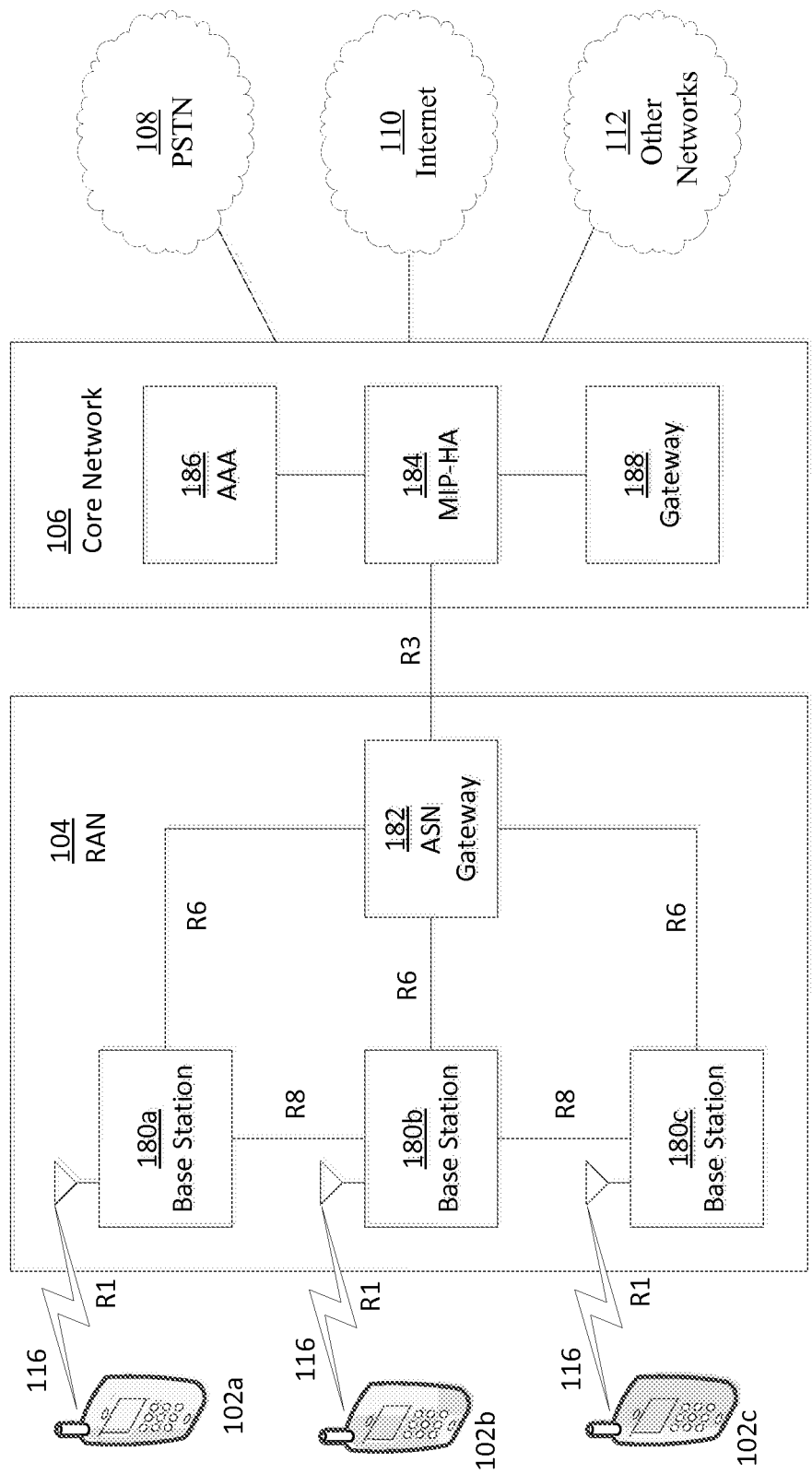
FIG. 1E is a system diagram of an example radio access network and an example core network that may be used within the communications system illustrated in FIG. 1A.

FIG. 1E is a system diagram of the RAN 104 and the core network 106 according to an embodiment. The RAN 104 may be an access service network (ASN) that employs IEEE 802.16 radio technology to communicate with the WTRUs 102*a*, 102*b*, 102*c* over the air interface 116. As will be further discussed below, the communication links between the different functional entities of the WTRUs 102*a*, 102*b*, 102*c*, the RAN 104, and the core network 106 may be defined as reference points.

As shown in FIG. 1E, the RAN 104 may include base stations 180*a*, 180*b*, 180*c*, and an ASN gateway 142, though it will be appreciated that the RAN 104 may include any number of base stations and ASN gateways while remaining consistent with an embodiment. The base stations 180*a*, 180*b*, 180*c* may each be associated with a particular cell (not shown) in the RAN 104 and may each include one or more transceivers for communicating with the WTRUs 102*a*, 102*b*, 102*c* over the air interface 116. In one embodiment, the base stations 180*a*, 180*b*, 180*c* may implement MIMO technology. Thus, the base station 140*a*, for example, may use multiple antennas to transmit wireless signals to, and receive wireless signals from, the WTRU 102*a*. The base stations 180*a*, 180*b*, 180*c* may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 106, and the like.

The air interface 116 between the WTRUs 102*a*, 102*b*, 102*c* and the RAN 104 may be defined as an R1 reference point that implements the IEEE 802.16 specification. In addition, each of the WTRUs 102*a*, 102*b*, 102*c* may establish a logical interface (not shown) with the core network 106. The logical interface between the WTRUs 102*a*, 102*b*, 102*c* and the core network 106 may be defined as an R2 reference point, which may be used for authentication, authorization, IP host configuration management, and/or mobility management.

The communication link between each of the base stations 180*a*, 180*b*, 180*c* may be defined as an R8 reference point that includes protocols for facilitating WTRU handovers and the transfer of data between base stations. The communication link between the base stations 180*a*, 180*b*, 180*c* and the ASN gateway 215 may be defined as an R6 reference point. The R6 reference point may include protocols for facilitating mobility management based on mobility events associated with each of the WTRUs 102*a*, 102*b*, 100*c*.

As shown in FIG. 1E, the RAN 104 may be connected to the core network 106. The communication link between the RAN 104 and the core network 106 may defined as an R3 reference point that includes protocols for facilitating data transfer and mobility management capabilities, for example. The core network 106 may include a mobile IP home agent (MIP-HA) 184, an authentication, authorization, accounting (AAA) server 186, and a gateway 188. While each of the foregoing elements are depicted as part of the core network 106, it will be appreciated that any one of these elements may be owned and/or operated by an entity other than the core network operator.

An opportunistic band may include unused TVWS frequencies that may be opened for unlicensed uses. For example, because there are fewer TV stations located outside top metropolitan areas, much of the unoccupied TVWS spectrum may be available in low population density or rural areas that tend to be underserved with other broadband options such as Digital Subscriber Line (DSL) or cable.

In the United States, each available TV channel may provide 6 MHz of spectrum capacity that may be used for broadband connectivity. TVWS may have much larger coverage areas due to long range propagation of signals at these frequencies. For example, a wireless local area network (WLAN) AP location operating in TVWS can provide coverage for an area of a few square miles. Wireless equipment currently in operation such as 802.11b/g/n may have an average coverage area of 150 square feet.

Some TVWS channels may be reserved for wireless microphones (WM). Wireless microphones may use additional channels during certain events, provided the operators register with the geo-location database to reserve the corresponding channel for the duration of the event.

In the United States, opportunistic use of frequency in the TVWS by WLAN systems is regulated by the FCC. Because these frequencies remain dedicated for use by over-the-air TV operations and wireless microphone usage, the FCC has introduced rules for the use of these frequencies by WLAN devices. The rules are meant to protect the primary users of these bands such as TV broadcast stations and wireless microphone operators, while allowing efficient and opportunistic use of the spectrum by unlicensed devices such as WLAN access points (APs) and their attached devices.

Unlicensed devices may be referred to as secondary devices or sensing devices herein. Secondary devices capable of sensing of TVWS channels may not have access to geo-location database information. For example, secondary devices may include Mode I and Mode II devices. Mode II devices may have direct access to geo-location database and/or devices operating on channels that are chosen by such devices. Mode I devices may have indirect access to the geo-location database. Secondary devices may include sensing-only devices. Sensing-only devices, or devices operate in sensing-only mode, may access opportunistic bands, but may not have access to a geo-location database. In an embodiment, sensing-only devices, or devices operate in sensing-only mode, may not have access to a Mode II device.

In a dense metropolitan area, the number of available channels as per the geo-location database may be small. However, the potential for use of many of these channels by TV band devices without interfering with any primary users is possible for several reasons. For example, in a basement or a highly populated area, TV and WLAN signals may exhibit strong attenuation and this attenuation may not be accounted for in the geo-location database when reserved areas are set aside for primary users. In addition, channels reserved exclusively for wireless microphone use may remain completely unused in certain areas. As a result, sensing-only devices provide an important means for finding bandwidth in densely populated areas and at certain times. As per the FCC, communication by sensing-only devices requires that all of these devices have sensing capability. The complexity, cost, and overhead in terms of bandwidth loss and power consumption of such devices may need to be controlled in order to make use of sensing-only mode for exploiting efficient TVWS bandwidth use in highly populated areas.

In an embodiment, a sensing device may use opportunistic bands even if the sensing device is not capable of sensing all the potential types of primary users. For example, a sensing device capable of sensing one type of primary user may operate on opportunistic bands while satisfying FCC regulations.

A sensing device may receive channel occupancy information. Channel occupancy information associated with a channel may include information indicative of, for a specific location, whether the channel is available/free, reserved for exclusive use of TV broadcast, or reserved for the specific use of wireless microphone. Channel occupancy information may include information regarding the type of primary user on a reserved channel. For example, the sensing device may receive occupancy information from the geo-location database. For example, a sensing device may not have direct access to the geo-location database, and may receive information from the database through a Mode II device that has access to the geo-location database.

Based on the channel occupancy information, a sensing device may monitor a reserved channel for one type of primary user, such as wireless microphone or DTV. This may reduce the complexity of sensing for the sensing devices. For example, this may allow for a reduction in sensing hardware in the sensing-only device, as well as a reduction in the system-wide silence time that must be scheduled in a system of sensing-only devices operating under the control of a centralized bandwidth coordinating function, or operating in a distributed fashion. This reduction in silent period time may result in an increase in network throughput. The reduction of sensing requirements may reduce power consumption at each of the sensing-only devices. Primary user detection time may also be reduced, as the sensing devices may focus on sensing for the primary users it knows can occupy a given channel.

Figure 2:
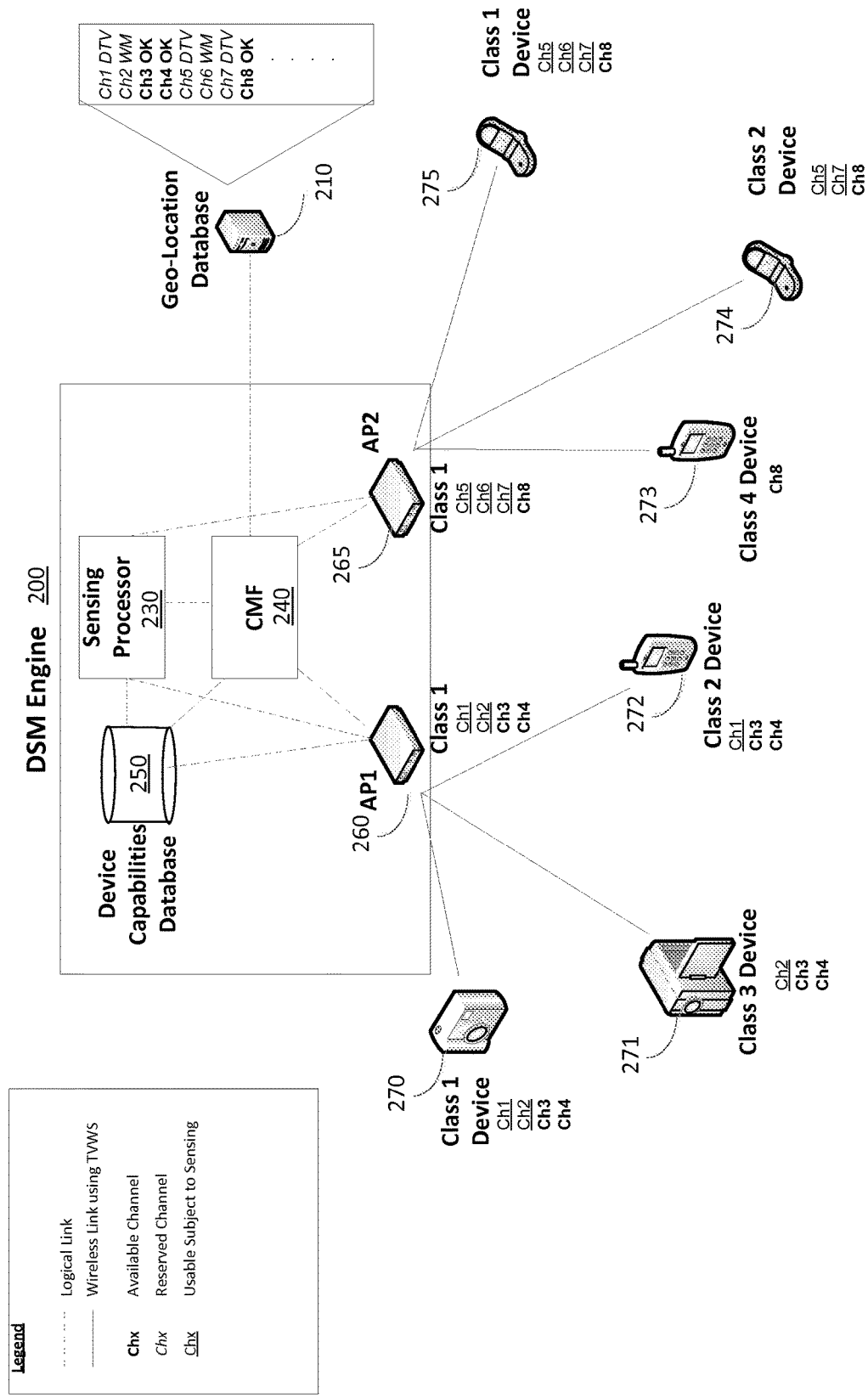
FIG. 2 is a system diagram of an example wireless network comprising a dynamic spectrum management (DSM) System with device classes.

FIG. 2 shows a dynamic spectrum management (DSM) system with device classes. The DSM system may include a DSM engine such as DSM engine 200. The DSM engine 200 may be connected to a network. The network may be an extension of a DSM system. The network may include or may be connected to one or more communication networks, such as the core network 106, the Internet 110, and/or the networks 112 described above with respect to FIGS. 1A-1E.

The network may include a set of devices such as devices 270-275 with varying types of sensing capabilities. Devices 270-275 may use available channels as per the geo-location database without performing sensing. However, available channels that may be free of primary users may be limited. If a device requires additional bandwidth beyond the channel(s) that are deemed available by the geo-location database, the device may perform sensing to identify additional channels such as opportunistic bands to use. The device may perform sensing to search for reserved channels whose primary user is absent, or is presently not occupying the channel. For example, a device may be within a TV broadcast transmission range, but the physical location of the device may prevent the device from acquiring or interfering with TV broadcast. For example, a primary user may reserve a channel with the FCC but may not use the spectrum for a period of time. A sensing device may communication on such opportunistic bands.

Devices 270-275 may include one or more sensing-only devices. A sensing-only device may perform sensing to search for incumbent-free channels among the channels specified as reserved by the geo-location database. The device may operate on the incumbent-free channels discovered via sensing.

Devices 270-275 may include one or more hybrid devices. A device capable of operating in hybrid mode may be referred to as a hybrid device. A device operating in hybrid mode may utilize channels that are specified to be available based on the geo-location database information. When the required number of channels needed by the device or network is not satisfied, the device may act as a sensing-only device. The device may operate as a sensing-only device on incumbent-free channels discovered via sensing. When acting as a sensing-only device, the device may operate in reduced transmission power.

A sensing device may include a device capable of performing sensing, such as a sensing-only device or a hybrid device. Sensing-only devices and hybrid devices operating in sensing-only mode may vacate a channel when a primary user is detected such that the FCC rules imposed on sensing are satisfied.

The DSM engine 200 may include one or more processors, memories, servers, databases, computers, UE, a mobile station, a fixed or mobile subscriber unit, a pager, a cellular telephone, a PDA, a smartphone, a laptop, a netbook, a personal computer, a wireless sensor, consumer electronics, and the like. As shown, the DSM engine 200 may include a device capabilities database 250. The device capabilities database 250 may store device classification information associated with each of the devices in the network. For example, devices such as the devices 270-275 may be classified based on sensing capabilities, such as primary users can be sensed and detected by the device.

A sensing device may have the capability of sensing for a subset of primary users. The sensing-only devices may be required to operate only on channels that are available or free according to the geo-location database and the reserved channels that been sensed and indicated as incumbent-free by the devices.

In an example TVWS system, a channel may be exclusively reserved to TV broadcast or to wireless microphone. One or more channels may be reserved exclusively for wireless microphone usage. These two channels may be restricted to TV broadcasts in the specific location. Wireless microphones use for special events may use channels other than the reserved channel(s) provided the wireless microphones register for a period of time with the TVWS database. The sensing devices may be equipped with hardware and/or software (HW/SW) to provide sensing for wireless microphone devices only or DTV signals only. Sensing devices in an example TVWS environment may be classified into four classes, such as class 1, class 2, class 3, and class 4.

A class 1 device such as devices 270 and 275 may operate as a Mode I or Mode II device (e.g., via database information), and may operate as a sensing-only device. A class 1 device may include sensing hardware and sensing software for monitoring and detecting wireless microphone and DTV signals in a TVWS channel.

A class 2 device such as devices 272 and 274 may operate as a Mode I or Mode II device, and may operate as a sensing-only device. A class 2 device may include sensing hardware and sensing software for monitoring and detecting DTV signals in a TVWS channel. In an embodiment, a class 2 device may not be equipped with the capability to sense for and detect wireless microphone.

A class 3 device such as devices 271 may operate as a Mode I or Mode II device, and may operate as a sensing-only device. A class 3 device may include sensing hardware and sensing software for monitoring and detecting wireless microphone in a TVWS channel. In an embodiment, a class 2 device may not be equipped with the capability to sense for and detect DTV signals.

A class 4 device such as devices 273 may operate as a Mode I or Mode II device. A class 4 device may not have sensing capability. A class 4 device may communicate on channels that are free of primary users as specified by the geo-location.

The DSM engine 200 may be categorized as a class 1 device. The DSM engine 200 may be categorized as a class 2 device, a class 3 device, or a class 4 device. The APs attached to the DMS engine such as AP1 260 and AP2 265 may be categorized as a class 1 device. A home eNodeB (HeNB) may be categorized as a class 1 device.

The above example device classification does not restrict the solution described herein. Device classification may be implemented in systems that provide opportunistic bands other than TVWS. For example, devices 270-275 may be categorized based on sensing of signals other than wireless microphone and DTV. Devices 270-275 may be categorized based on sensing for different categories of wireless microphone or DTV signals. For example, if different types of wireless microphones require different the sensing procedures for signal detection, the devices may be categorized based on the various wireless microphone types. The concepts described herein may be applied to multiple different types of primary users. The number of device classes may increase accordingly to devices which are capable of sensing for a subset of these primary users. Operation with the assumption of additional primary users could be possible on TVWS or on opportunistic bands other than TVWS which may be provided.

As shown in FIG. 2, the DSM engine 200 may include a channel management function (CMF) 240. The DSM engine 200 may include one or more access points (AP) such as AP1 260 and AP2 265.

The CMF 240 may include a protocol logic for communicating channel and cognitive information with other devices. The CMF 240 may include a Bandwidth Allocation & Control (BAC) algorithm that may select and maintain the list of channels maintained by each AP such as AP1 260 and AP2 265. The DSM engine 200 may include a sensing processor 230. The sensing processor 230 may control and oversee the sensing operations at the DSM engine 200 and the devices that join the network. The DSM engine 200 may include sensing hardware and sensing software for detecting wireless microphone, DTV or the like.

The DSM engine 200 may include one or more APs such as AP1 260 and AP2 265. In an embodiment, the APs may be replaced by eNBs, HeNBs, base stations and/or WTRUs. The DSM engine 200 may provide services for access to the opportunistic bands by a cellular system. An AP, eNB, HeNB or base station, may manage a different Radio Access Technologies (RAT) such as e.g., 802.11n, 802.11g, LTE, LTE-A, WCDMA. An AP, eNB, HeNB or base station, may manage the same RAT while operating in the TVWS band. Operation may occur in other bands such as ISM and licensed.

The DSM engine 200 may have access to the geo-location database 210. In an embodiment, the DSM engine 200 may be the only device with access to the geo-location database 210. In an embodiment, devices under the management of the DSM engine may also have access to the geo-location database 210.

The geo-location database 210 may control access to opportunistic spectrum such as TVWS. For example, the geo-location database may store information that may include, but not limited to, occupancy of a channel, the type of primary or priority user that is expected to be present on a channel that is deemed as reserved by the database and/or the expected occupancy time of a channel by a primary user. A primary user may include a system, a device, a service or the like that may be registered or licensed to use an opportunistic spectrum. A secondary user may include a system, a device, a service or the like, that may not be registered or licensed to use the opportunistic spectrum. A system operating in the opportunistic band may use the information in the database to provide sensing-only devices access to the opportunistic spectrum.

As illustrated in FIG. 2, the CMF 240 may assign a set of channels to each device 270-275 based on the device class, channel occupancy information from the database 210, and sensing results from the operations commanded by the sensing processor 230. Based on the information from the geo-location and TVWS database 210, the DSM engine 200 may allocate a subset of channels for devices with restricted sensing capability. For example, if a channel is listed by the database to be reserved for DTV, the channel may be allocated to a sensing device with DTV sensing capability, provided that device senses the channel to be incumbent free at its particular location. If a channel is listed by the database to be reserved for WM, the channel may be allocated to a sensing device with WM sensing capability, provided that device senses the channel to be incumbent-free at its particular location. If a channel is listed by the database to be available, the channel may be allocated to devices in classes 1-4.

As shown in FIG. 2, the geo-location database indicates that channels 1, 5 and 7 are reserved for DTV, and may be allocated to class 1 and class 2 devices such as devices 270, 274 and 275 that are capable of sensing DTV. Channels 3, 4 and 8 are available channels that do not require sensing, and may be allocated to devices in classes 1-4. A class 4 device, such as device 273 may be allocated with available channel 8. Channels 2 and 6 may be reserved for WM, and may be allocated to class 1 and 3 devices, such as devices 270, 271 and 275.

Figure 3:
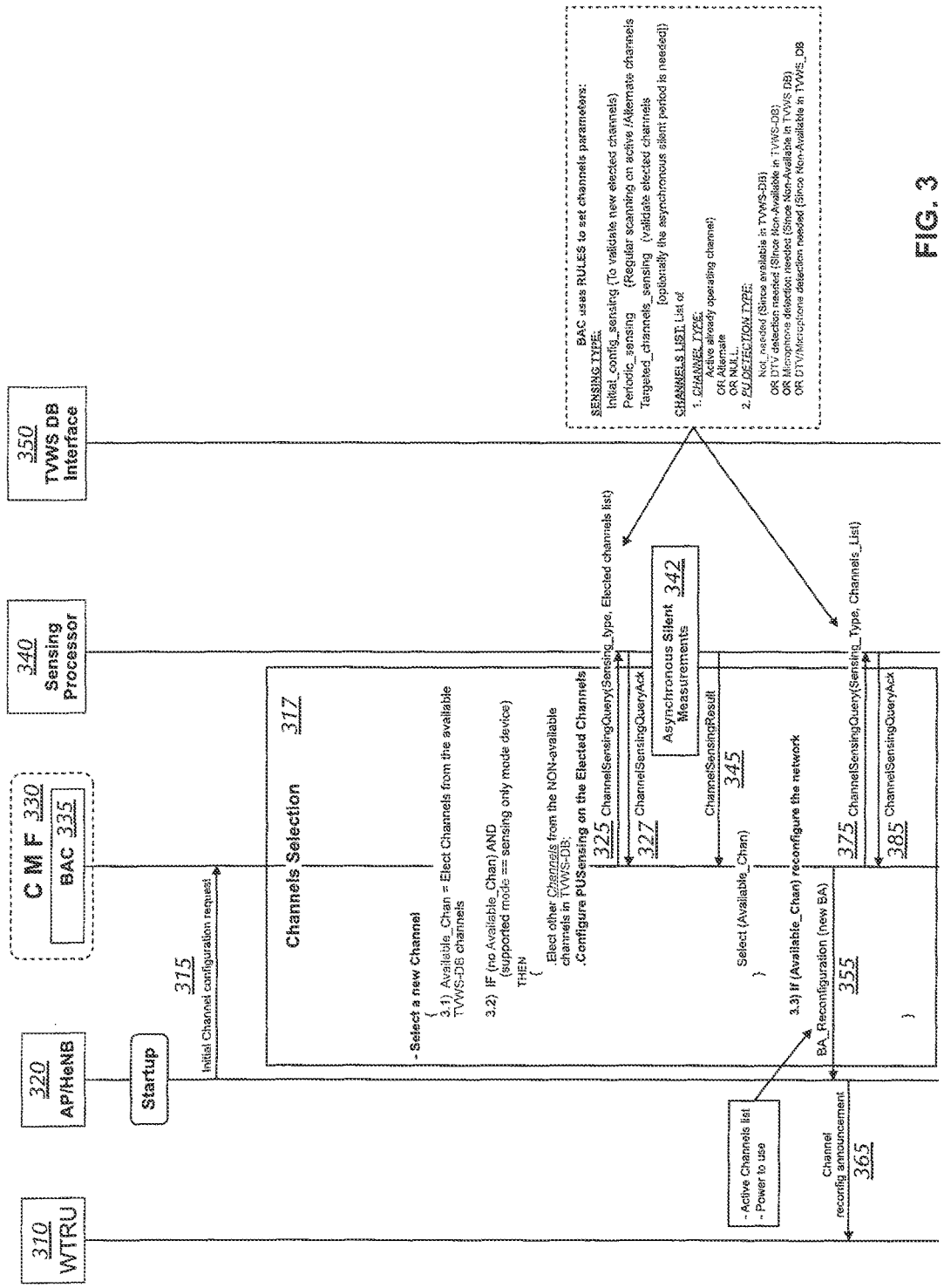
FIG. 3 shows example channel selection procedures.

FIG. 3 shows example channel selection procedures. At system initialization, a CMF such as CMF 330 may select one or more available channels for each of the AP or HeNB in the system. For the example, the CMF 330 may include a BAC 335 that may perform channel selection 317.

As shown, an AP or HeNB such as AP/HeNB 320 may start up. At 315, the AP/HeNB 320 may send an initial channel configuration request to the CMF 330. Upon receiving the request, the BAC 335 may query the geo-location database to obtain a list of available channels based on the channel occupancy information in the database. For example, at 325, the BAC 335 may send a channel sensing query message to the database via the sensing processor 340.

As shown in FIG. 3, a channel sensing query may be made for initial configuration sensing, periodic sensing, and/or targeted channel sensing. Initial configuration sensing may be performed to validate newly elected channels. Periodic sensing may be performed to regularly scan on active and/or alternative channels. Targeted channel sensing may be performed to validate elected channels, and may be performed when asynchronous silent period is needed. A channel sensing query may include a channel list parameter. The channel list parameter may indicate a channel type, such as active, alternative, or null.

At 327, the BAC 335 may receive a channel sensing query acknowledgement. At 342, asynchronous silent measurements may be performed. At 345, the BAC 335 may receive a list of available channels from the database. Available channels may refer to channels that are free of primary users, or channels that are not reserved for use by registered systems/services. In an embodiment, the AP/HeNB 320 may be configured with a minimum available channel size. If the number of available channels equals or is greater than the minimum available channel size, at 355, the BAC 335 may send to the AP/HeNB 320 a BAC reconfiguration message with a configuration of channels. When the AP/HeNB 320 receives the BAC reconfiguration message, the AP/HeNB 320 may use the configuration of channels for subsequent transmissions and receptions.

At 365, the AP/HeNB 320 may send a sensing device/client such as WTRU 310 a channel reconfiguration announcement. As described above, the AP/HeNB 320 may receive the BAC reconfiguration message with the channels to be used. The channels may be used to transmit the channel configuration and/or reconfiguration announcement. In an example WiFi system, a beacon may be used to transmit the channel configuration and/or reconfiguration announcement(s). In an example cellular system, the channel configuration and/or reconfiguration announcement may be transmitted in the form of system information. The clients such as WTRU 310 may detect the message, and may use the channel to communicate with the AP/HeNB 320.

In an embodiment, the list of available channels received by the BAC 335 from the geo-location database may not be sufficient to satisfy the system requirements determined by the BAC 335. For example, the number of available channels may be less than the minimum available channel size. The occupancy information for the reserved channels may be retrieved from the database. Based on the occupancy information, the BAC 335 may determine which type of primary user a reserved channel is currently reserved for. For example, the BAC 335 may determine whether a channel is reserved for DTV or wireless microphone based on occupancy information.

At 375, the BAC 335 may send a channel sensing query message such as ChannelSensingQuery to the sensing processor 340. The sensing processor 340 may configure or modify the sensing performed by the DSM engine or the AP/HeNB 320. The geo-location database may include occupancy information including information associated with primary user detection type for each channel. For example, each channel may be associated with a primary user detection type that may be selected from the following: 'Not Needed', 'DTV Detection Needed', 'Wireless Microphone Detection Needed', or 'DTV and Wireless Microphone Detection Needed.' The channel sensing query message may specify the information from the database associated with sensing. For example, the channel sensing query message may indicate which primary user needs to be sensed for by the sensing processor 340. For example, the channel list parameter in the ChannelSensingQuery may indicate the primary user detection type, such as sensing not needed, DTV detection needed, WM detection needed, or DTV and MW detection are both needed. Based on the value of the parameter, the type of sensing to be performed by the sensing processor 340 on each channel may be identified. At 385, the BAC 335 may receive a channel sensing result message such as ChannelSensingResult. The channel sensing result message may include the list of reserved channels that may be used as opportunistic bands based on sensing information.

In an embodiment, channel occupancy information may be retrieved from the geo-location database. The sensing processor such as the sensing processor 230 described with respect to FIG. 2, and/or the sensing processor 340 described with respect to FIG. 3 and FIG. 4, may perform sensing for the initial channel selection based on the channel occupancy information. The BAC 335 may allocate the opportunistic bands/channels to the AP/HeNB 320 for use in the system, in accordance with the classes of devices as described above.

Figure 4:
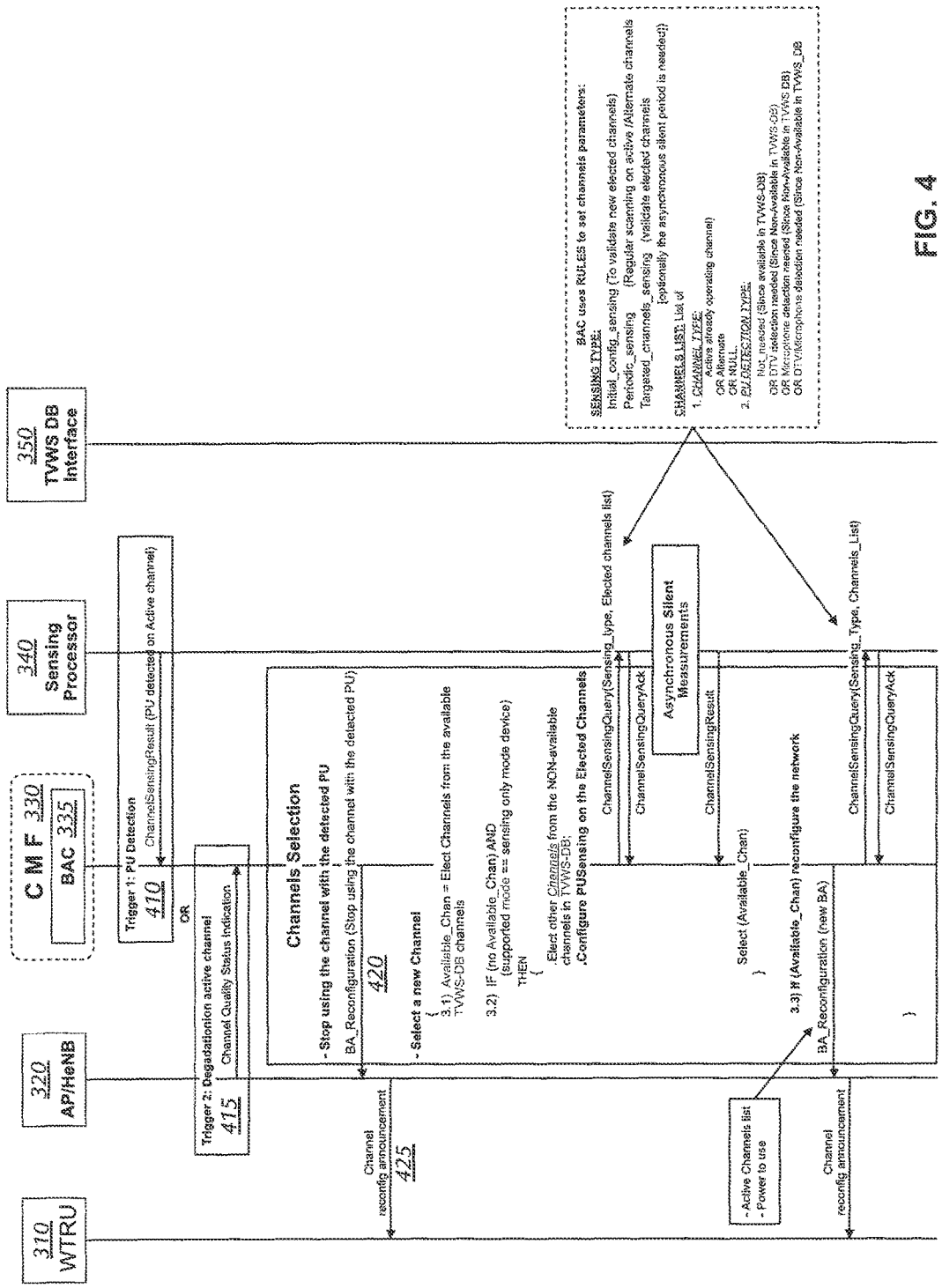
FIG. 4 illustrates example channel switch procedures.

FIG. 4 illustrates example channel switch procedures. The channel switch procedure may be triggered by the detection of a primary user, for example, by one of the devices operating in sensing-only mode on that particular channel. The channel switch procedure may be triggered by the degradation of a channel due to interference by a secondary network or non-primary interference source. As described above, the BAC 335 may receive channel occupancy information such as the time period during which a primary user may occupy a channel. The channel switch procedure may be triggered when the primary user occupancy time has started and/or expired.

As shown in FIG. 4, at 410, the BAC 335 may receive a channel sensing result message such as ChannelSensingResult indicating a primary user is detected on an active channel. For example, the primary user may be detected by the sensing processor 230 described above with respect to FIG. 2, and the BAC 335 may receive a detection message from the sensing processor 230. For example, devices operating on a channel in sensing-only mode may perform sensing on that channel. The primary user may be detected by a device that may be scheduled to monitor the channel by the sensing processor. The device may send an indication of the detection of the primary user to the BAC 335.

At 420, the BAC 335 may instruct the AP/HeNB 320 to stop using a channel where a primary user has been detected. For example, the BAC 335 may send a message such as a BAC reconfiguration message to the AP/HeNB 320 indicating the channel on which primary user is detected. At 425, the AP/HeNB 320 may send a channel reconfiguration announcement to the devices that may use the channel, such as WTRU 310. The BAC 335 may perform channel selection. As shown in FIG. 4, the channel selection procedure 317 described above with respect to FIG. 3, or a subset of the procedure, may be employed to replace an occupied channel with a new channel.

In an example WiFi system, operating channels may be obtained using the procedures described above with respect to FIG. 3 and FIG. 4. A device may use a subset of the channels associated with an AP to communicate in several different ways. For example, the device may choose one of the channels for communication with the AP, and may use the other channels for direct link communication with other devices. For example, the device may use media access control (MAC) layer aggregation employing primary carrier sense multiple access (CSMA). The CMF 240 may allocate a channel usable by class 1-class 4 devices as the primary channel. Primary CSMA can be used by the devices to access the channel. The number of channels in the aggregation may be based on the device class.

Figure 5:
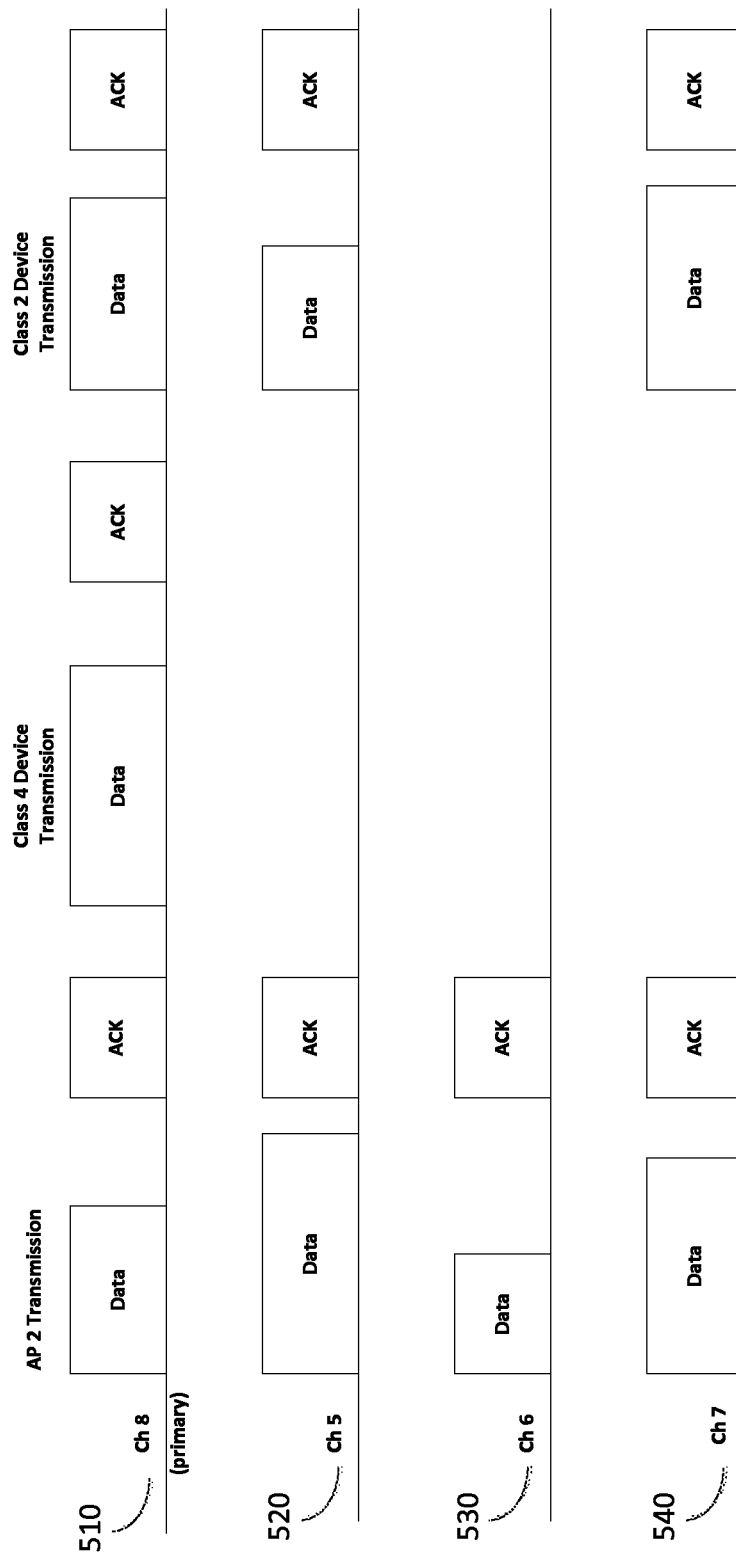
FIG. 5 illustrates an example channel aggregation in DSM system with device classes.

FIG. 5 illustrates an example channel aggregation in DSM system with device classes. As shown, a primary channel 510 such as ch 8 may be used to communicate with the AP. The other channels in the aggregation, such as channels 520-540 or ch 5-7 may be used for direct link communication with other devices.

Channels may be allocated statically or dynamically. For example, channels may be allocated based on number of attached clients or bandwidth requirements. In an embodiment, a predetermined number of channels may be allocated. The channels may be used by the devices connected to the AP. The BAC may allocate more channels when more device(s) connects to the AP.

For purposes of illustrating a method for allocating channels based on device classes, assume that the BAC may first allocate a single channel to the AP. The AP may use the channel to send one or more beacons. The BAC may allocate additional channels as more devices join the network. For example, the BAC may identify a free channel from the TVWS database. The BAC may send one or more beacons on the identified available channel. The channel type included in the beacon may indicate that the channel may be used by any device such as devices in classes 1-4.

Figure 6:
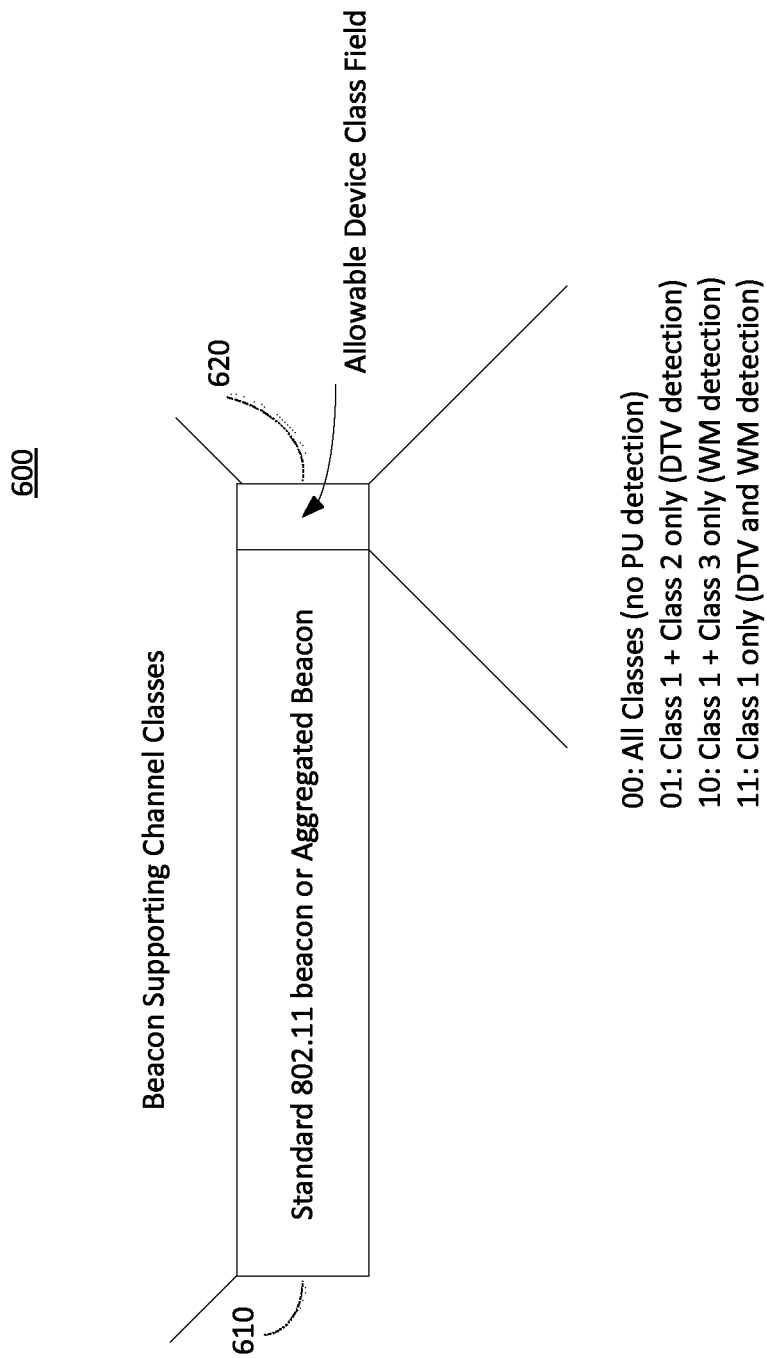
FIG. 6 is an example block diagram of an example beacon supporting channel classes.

FIG. 6 illustrates an example beacon containing an allowable device class field. As shown, the beacon 600 may include a portion 610 that may correspond to a standard 802.11 beacon or an aggregated beacon, and a portion 620 that indicates channel type information. Channel type information may include an indication of the channel type associated with the channel used to send out the beacon. The channel type may be determined by the information obtained about the channel from the TVWS database. As shown in FIG. 6, channel type information may be indicated in a data field such as the allowable device class field. The allowable device class field may be a two-bit field. For example, when no primary user is detected on the channel, the allowable device class field may be "00," and the channel may be used by devices of classes 1-4. When DTV detection is needed to operate on the channel, the allowable device class field may be "01," and the channel may be used by devices of classes 1 and 2. When WM detection is needed to operate on the channel, the allowable device class field may be "10," and the channel may be used by devices of classes 1 and 2. When WM and DTV detection is needed to operate on the channel, the allowable device class field may be "11," and the channel may be used by devices of class 1.

In an embodiment, the BAC may determine that all channels are reserved based on the TVWS database information. The BAC may instruct the sensing processor to start a sensing operation. For example, the sensing process may use the sensing HW/SW of the DSM engine to sense the channels in the TVWS to identify the channel(s) where primary users are not present.

The BAC may instruct the sensing processor to perform sensing operation on a subset of the reserved channels, or target channels. The target channels may be determined based on the type of the primary user and/or when the primary user of each channel is expected to use the reserved channel. For example, the BAC may send the expected primary user information for each of the channels to the sensing processor. As described above with respect to FIGS. 3 and 4, the expected primary user may be determined based on channel occupancy information in the database. Sensing on targeted channels may simplify the sensing operation. The sensing processor may use the expected primary user information to sense a particular type of primary user (e.g., WM and/or DTV). The sensing processor may use the expected primary user information to perform sensing in a particular time frame. The sensing processor may identify one or more channels which the AP may use to transmit beacon(s) and start network initialization.

As described above, the AP may obtain a list of channels that the AP may transmit. In an embodiment, the AP may select a subset of the channels for transmitting beacons. In an embodiment, the AP may transmit beacons on all of the selected channels. The AP may allow aggregation of multiple channels. For example, the AP may transmit a single beacon on one channel, and the beacon information on that channel may define the allowable channel class for each of the channels in the aggregation set.

Figure 7:
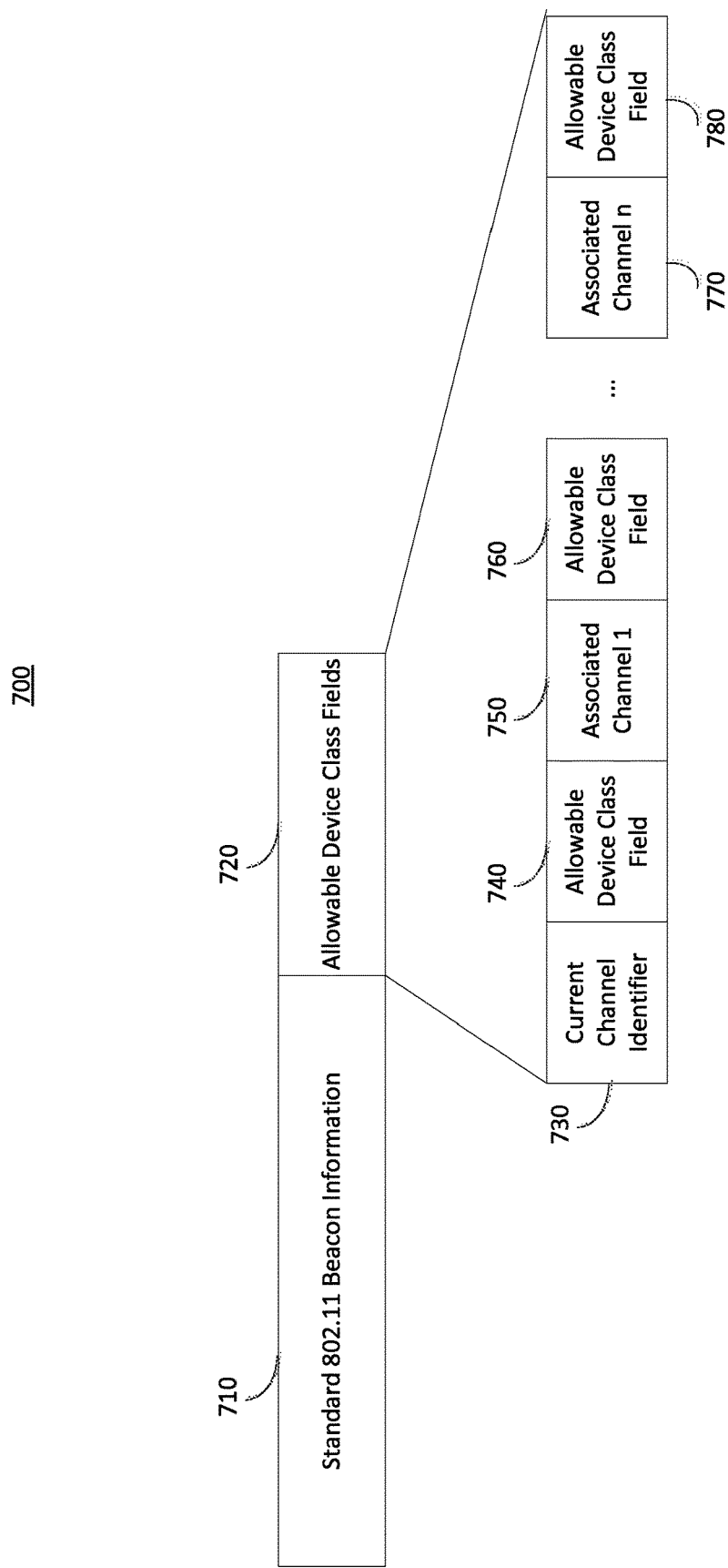
FIG. 7 is an example block diagram of an example beacon supporting channel classes.

FIG. 7 illustrates an example format of a beacon in Channel Aggregation Scenario. As shown, the beacon 700 may include a portion 710 that may correspond to a standard 802.11 beacon or an aggregated beacon, and a portion 720 that indicates channel type information. As shown in FIG. 7, channel type information may be indicated in a data field such as the allowable device class field. The beacon 700 may include allowable channel class information for multiple channels. The channel type information or allowable channel class information may include a channel identifier such as channel identifiers 730, 750 and 770 that may uniquely identify each channel in the aggregation. For example, the channel identifier may identify the channel either by frequency or by a predefined index in the band of interest. The channel type information or allowable channel class information may include the allowable device class field of the current channel 740 and a set of allowable device class fields 760 and 780 for each of the associated channels in the aggregation. As shown, each channel identifier may be followed by the allowable device class field of the corresponding channel.

Figure 8:
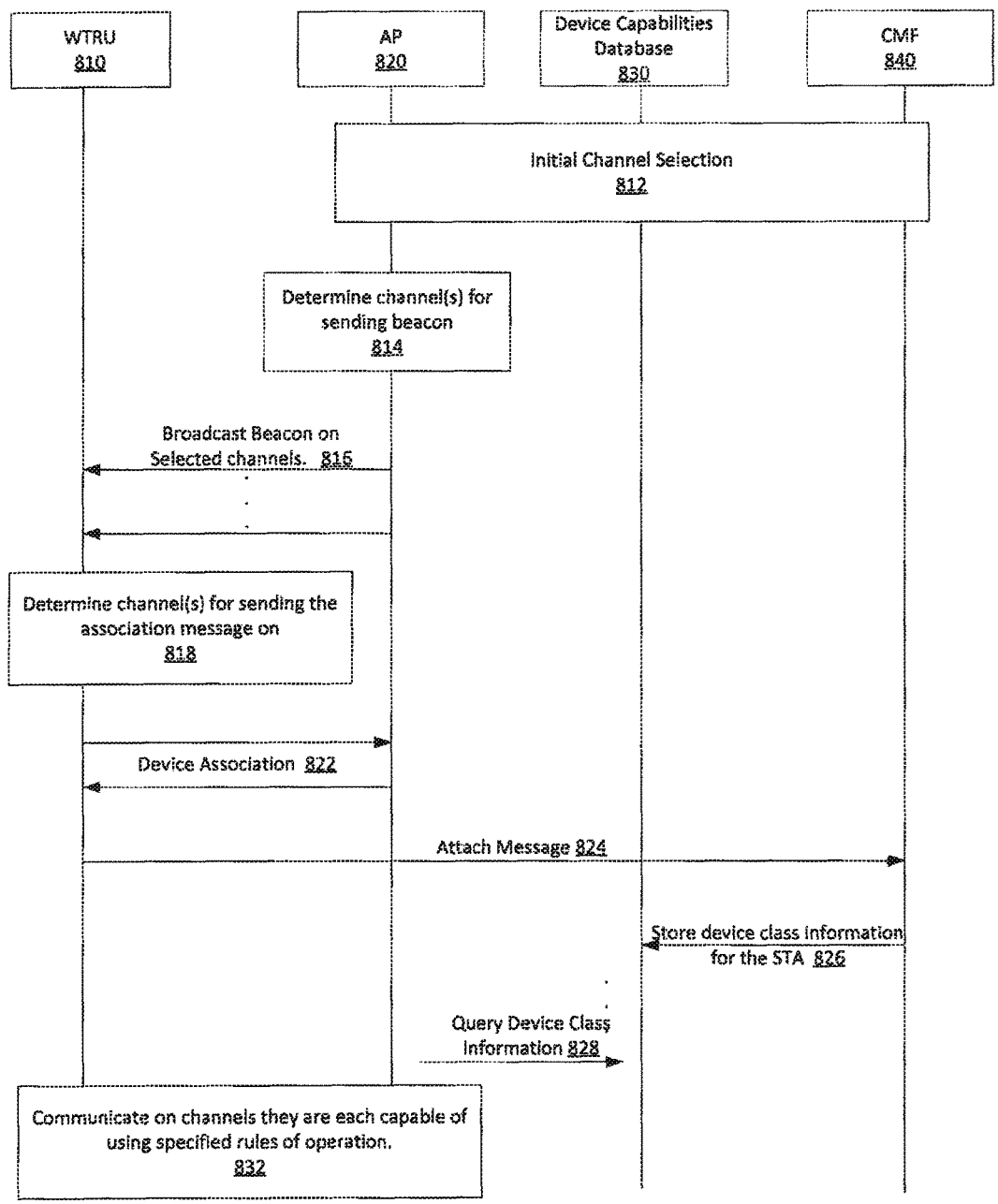
FIG. 8 illustrates the operation and signaling when a device joins the DSM managed network.

FIG. 8 illustrates the operation and signaling when a device joins the DSM managed network. As shown, WTRU 810 may join a DSM managed network that may include AP 820, device capabilities database 830, and CMF 840. The WTRU 810 may include a sensing device, such as a station (STA) device. At 812, initial channel selection may be performed. For example, initial channel selection may be performed as described above with respect to FIG. 3. At 820, the AP 820 may select one or more channels for sending beacon(s). At 816, the AP 820 may broadcast beacon(s) on the selected channels. For example, the beacon may include allowable channel class information for the selected channels.

As shown, at 818, the WTRU 810 may determine one or more channels for sending association message on. The WTRU 810 may search for a beacon in the channels. The WTRU 810 may determine if the WTRU 810 is allowed to communicate on the channel based on the channel type information or allowed device class information in the beacon. For example, if the beacon is transmitted on a free channel, the WTRU 810 may be associated with the AP 820, regardless of the device class. For example, if the channel type is a channel reserved for DTV, whether the WTRU 810 may use the channel may be determined through the sensing HW/SW at the DSM Engine. If the channel is presently incumbent-free, devices of class 1 and class 2 may associate with the AP on this channel. In an embodiment, multiple channels may be aggregated. The WTRU 810 may determine the number of channels for transmission based on the information from the beacon. For example, the WTRU 810 may send the association message on one of the channels in the aggregation, (e.g., the channel used to send the beacon). For example, the WTRU 810 may send the association message on multiple channels. At 822, the WTRU 810 may send the association request to the AP 820, and may receive association confirmation from the AP 820.

As shown, at 824, the WTRU 810 may send an attach message to the CMF 840. For example, the attachment message may be sent on the primary channel. The primary channel may correspond to the channel that the AP 820 used to send the beacon. The attachment message may be sent on the channel(s) that the WTRU 810 may be allowed to use based on the device class and the information transmitted in the beacon. The attach message may include device sensing capability information. For example, device sensing capability information may include the device class. At 826, the CMF 840 may collect and store the sensing capability information for each of the devices that may have successfully attached to the DSM Engine. The sensing capability information may be stored in a database such as the device capabilities database 830.

Device class information may be used to improve the efficiency of channel allocation for the system. In an embodiment, device class information may be used in conjunction with occupancy information obtained from the geo-location database and the sensing at each device. The device class information may be used by the DSM Engine to schedule silent periods on the channels used by each of the APs. For example, if a set of devices operating on a specific channel that requires DTV sensing are only capable of DTV sensing, their sensing algorithms may require less silent period time than devices sensing for both DTV and WM. The device class information may be present in the device class information sent by each device.

At 828, the AP 820 may query device class information from the device capabilities database. The AP 820 may use the information to determine the rules for communication with the WTRU 810 using aggregation. In an embodiment, sensing on channels that may be reserved by a primary user may be required only at the transmitter. At 832, the AP 820 and the WTRU 810 may communicate on one or more channels. For example, if the AP 820 is capable of WM detection only, the CMF 840 may assign the AP 820 channels where primary user need not be detected, and/or where only WM may need to be detected. The AP 820 may communicate with the devices such as the WTRU 810 that may not have sensing capability. In such communications, the AP may transmit on channels with class codes "00" or "10," and the WTRU 810 may transmit on the channels with class code "00." In an embodiment, the AP 820 and the WTRU 810 may communicate through aggregation using the channels allocated from the CMF 840.

The sensing processor may use the device class information of the WTRU 810 and the AP 820 to send a sensing configuration to each device to configure sensing of channels based on their types. When a device no longer needs to use a channel in sensing-only mode, the device may not perform sensing on that channel. The AP may continue to send beacons on that channel, provided that sensing performed by the DSM Engine sensing HW indicates the absence of the primary user of the channel.

Figure 9:
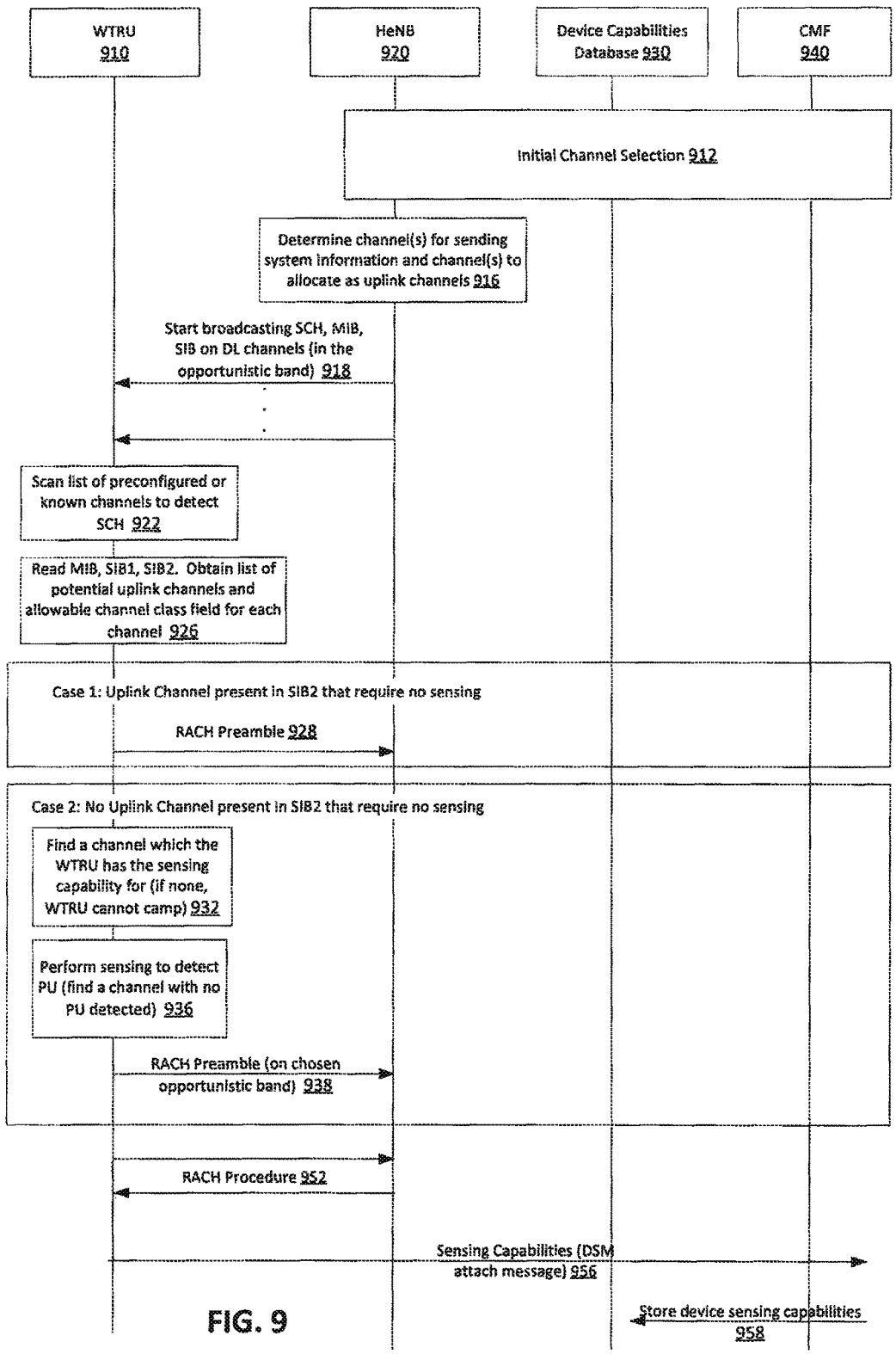
FIG. 9 illustrates DSM operations in an example cellular system.

FIG. 9 illustrates DSM operations in an example cellular system. For example, one or more WTRUs such as WTRU 910 may transmit via one or more HeNB such as HeNB 920. The WTRU 910 may include a sensing device. At 912, initial channel selection may be performed. For example, initial channel selection may be performed as described above with respect to FIG. 3. At 916, the HeNB 920 may determine one or more channels for sending system information, and may determine one or more channels to allocate as uplink channels. For example, the HeNB 920 may obtain operating channel(s) from the CMF 740. The HeNB 920 may select a subset of the channels as downlink transmission channels and a subset of the channels as uplink transmission channels.

At 918, the HeNB 920 may transmit system information such as Master Information Block (MIB), System Information Block (SIB), Synchronization Channel (SCH) and/or the like on channels determined as available channels. The system information may be transmitted in opportunistic band(s) on an as-needed basis. The system information may include the device class information for the channels to be used as uplink channels by the WTRUs attached to the HeNBs, such as WTRU 910. The WTRU 910 may perform an access procedure on a channel that the WTRU 910 is allowed to transmit on. The channel may be selected based on the method described above. For example, a channel may be selected if detection of primary user(s) is not required on the channel, or if the WTRU 910 has the capability of detecting the type of primary user registered on the channel.

The channel class information may be transmitted on SIB, SIB2, SCH, MIB, or any other broadcast channel that may be read by multiple WTRUs over the downlink channel. For example, channel class information may be transmitted on SIB2. The HeNB 920 may identify the set of downlink channels, and may broadcast SCH, MIB, and SIB on one or more of these channels. The HeNB 920 may broadcast on the licensed band in the case of aggregation between cells on the licensed and opportunistic bands, for example. At 922, the WTRU 910 may scan a predetermined list of known channels to identify the SCH. At 926, the WTRU 910 may read MIB and SIB1, and may obtain a list of available channels that can be used as uplink channels, and the associated channel class information for those channels.

The WTRU 910 may identify a channel for performing Random Access Channel (RACH) procedure. For example, the WTRU 910 may identify a channel that does not require sensing, or channel that the WTRU 910 has the capability of sensing for the expected primary user on the channel, or a channel without a primary user being present. At 928, the WTRU 910 may start the RACH procedure using the identified channel. The WTRU 910 may attach to the HeNB/ network, and may send the sensing capability information associated with the WTRU 910 to the DSM Engine. This may enable the HeNB 920 to determine the channels which the WTRU 910 may transmit on and may allow the sensing processor to configure sensing by the WTRU 910 on those channels. The HeNB 920 may make scheduling decisions based on the channel class and periodic sensing results sent by the WTRU 910 for these potential uplink channels. In an embodiment, the WTRU 910 may not be able to identify a channel for performing RACH procedure, and the WTRU 910 may not attach to the HeNB 920.

In an embodiment, the WTRU 910 may not identify a channel that does not require sensing. At 932, the WTRU 910 may search for a channel whose primary user may be sensed by the WTRU 910. If the WTRU 910 cannot identify such a channel, the WTRU 910 may not camp on any channel. If the WTRU 910 successfully identifies a channel that the WTRU is capable of sensing the primary user(s) thereon, at 936, the WTRU 910 may perform sensing to detect the primary user. If no primary user is detected, at 938, the WTRU 910 may send the RACH preamble to the HeNB 920 on the chosen channel. At 952, the WTRU 910 may choose to operate on the channel, and may perform RACH procedure. At 956, the WTRU 910 may send the sensing capabilities information of the WTRU 910 to the CMF 940. For example, the sensing capabilities information may be sent via a DSM attach message. At 958, the CMF 940 may forward the sensing capabilities information of the WTRU 910 to the device capabilities database 930 for storage.

FIG. 10 illustrates an example process for communicating in an opportunistic band. As shown, at 1010, the WTRU may receive information indicative of the type of the primary user of a reserved channel. The WTRU may receive the primary user type information from a geo-location database. At 1020, the WTRU may determine whether the WTRU is capable of sensing the primary user based on the primary user type information. At 1025, based on a determination that the WTRU is capable of sensing the primary user, the WTRU may determine whether the primary user is present on the channel. The WTRU may perform sensing to detect the primary user. If the WTRU cannot sense the primary user, the WTRU may camp on the channel. At 1030, the WTRU may operate on the channel in sensing-only mode based on a determination that the primary user is not present. While operating on the channel, the WTRU may perform sensing on the channel to detect the primary user. If it is determined that the WTRU is not capable of sensing the primary user, the WTRU may identify a second reserved channel, and may determine whether it is capable of sensing the primary user of the second reserved channel. At 1040, the WTRU may detect the presence of the primary user operating on the channel. Upon detection of the presence of the primary user, the WTRU may vacate the channel.

FIG. 11 illustrates an example process for communicating in an opportunistic band. As shown, at 1110, the primary user type of a channel may be received. For example, the primary user type information of a channel reserved by a primary user may be received at an access point, or a HeNB. At 1120, the device classes that are suitable for sensing the primary user of the channel, or devices classes that may be allowed to use the channel subject to sensing may be determined. At 1130, an indication of the determined device classes may be broadcasted. For example, the allowable device classes may be broadcasted via a beacon.

Although features and elements are described above in particular combinations, one of ordinary skill in the art will appreciate that each feature or element can be used alone or in any combination with the other program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method for operating on an opportunistic band, the method comprising:
   storing, at a wireless transmit and receive unit (WTRU), sensing capability information, wherein the WTRU is capable of sensing at least one type of a primary user of a reserved channel;
   receiving, at the WTRU, a type information related to a primary user of a first channel, wherein the first channel is reserved for use by the primary user;
   determining whether the first channel is available based on a geo-location database, wherein, if the first channel is available, using the first channel, and wherein if the first channel is unavailable, determining, at the WTRU, whether the WTRU is capable of sensing the primary user based on the type information related to the primary user of the first channel and the sensing capability of the WTRU; and
   selecting an operating channel on the opportunistic band based on the determining, wherein:
      based on a determination that the WTRU is capable of sensing the primary user of the first channel, further determining whether the primary user of the first channel is present on the first channel and operating on the first channel in sensing-only mode based on a determination that the primary user of the first channel is absent, and
      based on a determination that the WTRU is not capable of sensing the primary user of the first channel, searching for a second channel reserved for use by a second type of primary user.

2. The method of claim 1, further comprising:
   monitoring the first channel for the presence of the primary user of the first channel; and
   vacating the first channel upon detection of the presence of the primary user of the first channel.

3. The method of claim 1, further comprising:
   receiving expected occupancy time of the primary user of the first channel; and
   vacating the first channel during the expected occupancy time.

4. The method of claim 1, further comprising:
   receiving expected occupancy time of the primary user of the first channel; and
   monitoring the first channel for the presence of the primary user of the first channel during the expected occupancy time.

5. A wireless transmit and receive unit (WTRU) for operating on an opportunistic band, the WTRU comprising:
   a memory to store sensing capability information, wherein the WTRU is capable of sensing at least one type of a primary user of a reserved channel; and
   a processor to execute instructions from the memory, the processor configured to:
      receive type information related to a primary user of a first channel, wherein the first channel is reserved for use by the primary user;
      determine whether the first channel is available based on a geo-location database,
      determine whether the WTRU is capable of sensing the primary user based on the type information related to the primary user of the first channel and a sensing capability of the WTRU; and
      select an operating channel on the opportunistic band based on the determination, wherein:
         based on a determination that the first channel is available based on a geo-location database, the WTRU uses the first channel, and wherein if the first channel is unavailable,
         based on a determination that the WTRU is capable of sensing the primary user, the processor is configured to further determine whether the primary user is present on the first channel, and operate on the first channel in sensing-only mode based on a determination that the primary user is absent, and
         based on a determination that the WTRU is not capable of sensing the primary user, the processor is configured to search for a second channel reserved for use by a second type of primary user.

6. The WTRU of claim 5, wherein the processor is further configured to:
   monitor the channel for the presence of the primary user; and
   vacate the channel upon detection of the presence of the primary user.

7. The WTRU of claim 5, wherein the processor is further configured to monitor the channel for the presence of the primary user, and a transceiver is configured to vacate the channel upon detection of the presence of the primary user.

8. The WTRU of claim 5, wherein a transceiver is configured to receive expected occupancy time of the primary user, and the processor is further configured to monitor the channel for the presence of the primary user during the expected occupancy time.

9. A dynamic spectrum management (DSM) system for providing access to an opportunistic band to a plurality of sensing devices, the system comprising:
   a device capabilities database configured to store device sensing type information indicating sensing capability of a plurality of sensing devices, wherein a sensing device of a first class is configured to sense the presence of a first type of primary user and a second type of primary user, a sensing device of a second class is configured to sense the presence of a single type of primary user, and a sensing device of a third class does not have sensing capability; and
   a DSM engine configured to:
      classify the plurality of sensing devices based on their respective sensing capability;

retrieve channel occupancy information based on a geo-location database, and select a channel for an access point (AP) based on the channel occupancy information associated with the channel wherein, on a condition that the channel is unavailable, select a device sensing type associated with a sensing device connected to the AP such that the sensing device connected to the AP is capable of sensing a primary user of the channel or, if the sensing device is not capable of sensing the primary user of the channel, searching for a second channel reserved for use by a second type of primary user.

10. The system of claim 9, wherein at least one of the sensing devices is configured to operate as a Mode I or Mode II device.

11. A wireless transmit and receive unit (WTRU) for operating on an opportunistic band, the WTRU comprising:

a memory to store sensing capability information, wherein the WTRU is capable of sensing at least one type of a primary user of a reserved channel; and a processor to execute instructions from the memory, the processor configured to:

send a sensing capability information associated with the WTRU;

receive an indication of an allowable channel sensing type associated with a channel, wherein the WTRU is associated with one of a plurality of sensing types based on the sensing capability of the WTRU, wherein a sensing device of a first class is configured to sense the presence of a first type of primary user and a second type of primary user, a sensing device of a second class is configured to sense the presence of a single type of primary user, and a sensing device of a third class does not have sensing capability;

determine whether the channel is available based on a geo-location database, wherein, if the channel is available, using the channel, and wherein if the channel is unavailable, determine whether the WTRU is allowed to communicate on the channel based on whether the sensing type associated with the WTRU corresponds to the allowable channel sensing type associated with the channel; and send an association message for communicating on the channel based on a determination that the WTRU is allowed to communicate on the channel.

12. The WTRU of claim 11, wherein the processor is further configured to perform a Random Access Channel procedure on the channel based on the determination that the WTRU is allowed to communicate on the channel.

13. A method for facilitating communication in an opportunistic band, the method comprising:

receiving a channel allocation associated with a channel, wherein the channel is reserved for use by a type of primary user;

determining at least one allowable channel sensing type associated with the channel based on a sensing capability for sensing the primary user of the channel, wherein a sensing device of a first class is configured to sense the presence of a first type of primary user and a second type of primary user, a sensing device of a second class is configured to sense the presence of a single type of primary user, and a sensing device of a third class does not have sensing capability;

determining if sensing of the primary user is required, and if not, using the channel, and if so;

broadcasting an indication of the at least one allowable channel sensing type and requirements associated with the channel, including allowable sensing device class information; and depending on whether the first type of primary user or the second type of primary user is to be sensed, receiving an indication from at least one of a sensing device of the first class or a sensing device of the second class as an allowable sensing device.

14. The method of claim 13, wherein the indication is broadcasted using a beacon, the beacon comprising an indication of the channel and indication of the at least one allowable channel sensing type associated with the channel.

15. The method of claim 13, wherein the indication is broadcasted using a beacon, wherein the beacon comprising a plurality of channel identifiers and a plurality of allowable channel sensing type fields, wherein each identifier identifying a channel and corresponds to an allowable channel sensing type field, and each allowable channel sensing type field indicating at least one allowable channel sensing type for the corresponding channel.

16. The method of claim 13, wherein the indication is broadcasted via at least one of, SCH, MIB, or SIB.

17. An access point for facilitating communication in an opportunistic band, the access point comprising:

a memory; and a processor to execute instructions from the memory, the processor configured to:

receive a channel allocation associated with a channel, wherein the channel is reserved for use by a type of primary user;

determine at least one allowable channel sensing type associated with the channel based on a sensing capability for sensing the primary user of the channel, wherein a sensing device of a first class is configured to sense the presence of a first type of primary user and a second type of primary user, a sensing device of a second class is configured to sense the presence of a single type of primary user, and a sensing device of a third class does not have sensing capability; and determine whether the channel is available based on a geo-location database, and if the channel is available, broadcast an indication that the channel is available, and if the channel is unavailable, determine that sensing of the primary user is required and broadcast an indication of the at least one allowable channel sensing type and requirements associated with the channel, including allowable sensing device class information.

* * * * *